(12) United States Patent
Takeshige

(10) Patent No.: US 10,013,393 B2
(45) Date of Patent: Jul. 3, 2018

(54) PARALLEL COMPUTER SYSTEM, PARALLEL COMPUTING METHOD, AND PROGRAM STORAGE MEDIUM

(71) Applicant: FUJITSU LIMITED, Kawasaki-shi, Kanagawa (JP)

(72) Inventor: Kazuaki Takeshige, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 15/137,238

(22) Filed: Apr. 25, 2016

(65) Prior Publication Data

US 2016/0357707 A1    Dec. 8, 2016

(30) Foreign Application Priority Data

Jun. 2, 2015    (JP) .................. 2015-112250

(51) Int. Cl.
 *G06F 7/16*    (2006.01)
 *G06F 17/16*    (2006.01)
(52) U.S. Cl.
 CPC ................... *G06F 17/16* (2013.01)
(58) Field of Classification Search
 CPC ....................................................... G06F 17/16
 See application file for complete search history.

(56) References Cited

U.S. PATENT DOCUMENTS

| 2004/0193841 | A1* | 9/2004 | Nakanishi | ............... | G06F 17/16 |
|---|---|---|---|---|---|
| | | | | | 712/10 |
| 2006/0064452 | A1 | 3/2006 | Nakanishi | | |
| 2009/0300091 | A1* | 12/2009 | Brokenshire | ........... | G06F 17/16 |
| | | | | | 708/607 |
| 2009/0319592 | A1 | 12/2009 | Nakanishi | | |

FOREIGN PATENT DOCUMENTS

| JP | 2000-339295 | 12/2000 |
|---|---|---|
| JP | 2006-85619 | 3/2006 |
| JP | 2008-176738 | 7/2008 |
| WO | 2008/136045 A1 | 11/2008 |

OTHER PUBLICATIONS

"HPL—A Portable Implementation of the High-Performance Linpack Benchmark for Distributed-Memory Computers", Innovative Computing Laboratory, 1 pp., Sep. 27, 2000, http://www.netlib.org/benchmark/hpl_oldest/.

* cited by examiner

*Primary Examiner* — Chuong D Ngo
(74) *Attorney, Agent, or Firm* — Staas & Halsey LLP

(57) ABSTRACT

A parallel computer system including a plurality of processors configured to perform LU factorization in parallel, the system is configured to cause each of the plurality of processors to execute processing including: generating a first panel by integrating a plurality of row panels among panels of a matrix to be subjected to the LU-factorization, the plurality of row panels being processed by the processor, generating a second panel by integrating a plurality of column panels among the panels of the matrix, the plurality of column panels being processed by the processor, and computing a matrix product of the first panel and the second panel. In parallel with the computation of the matrix product, each processor is configured to receive or transmit a column panel to be used for computation of a subsequent matrix product from or to another processor among the plurality of processors.

7 Claims, 44 Drawing Sheets

FIG. 19
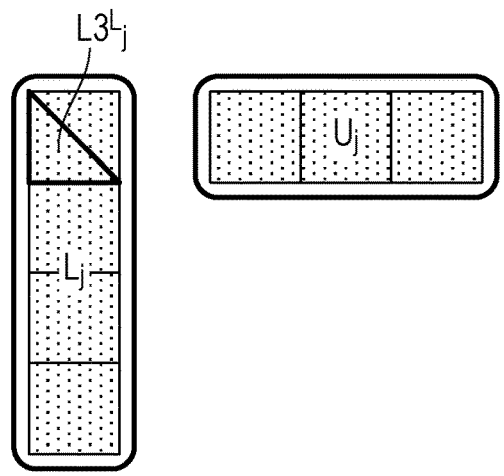
FIG. 20
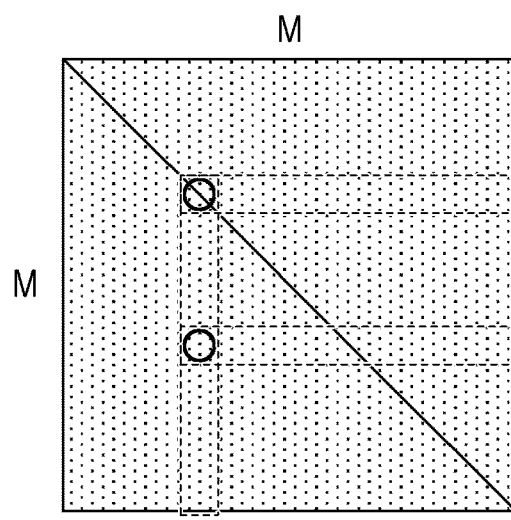
PIVOT
INFORMATION
$ipiv_j$
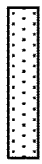

FIG. 25
FLOW OF PROCESSES
(1) PANEL-FACTORIZE $L_1$
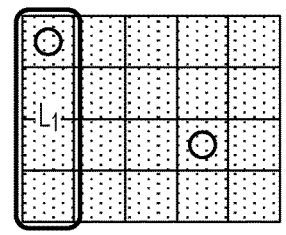
(2) TRANSMIT $L_1$
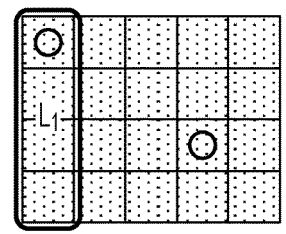
TRANSMIT $L_1$ AND PIVOT
INFORMATION ACQUIRED
DURING PANEL FACTORIZATION
OF $L_1$ TO NODE (0, 1)
(3) PANEL-FACTORIZE $L_2$ (PERFORMED ONLY BY NODES (*, 1).
NODE (0, 0) DOES NOTHING)
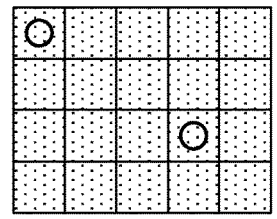
(4) RECEIVE $L_2$
 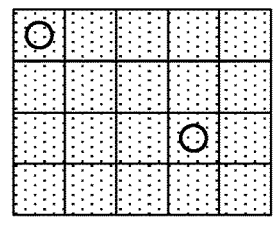
RECEIVE $L_2$ AND PIVOT INFORMATION
ACQUIRED DURING PANEL
FACTORIZATION OF $L_2$ FROM NODE (0, 1)

FIG. 26
j = 1
(5) PANEL-FACTORIZE $L_3$
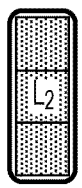 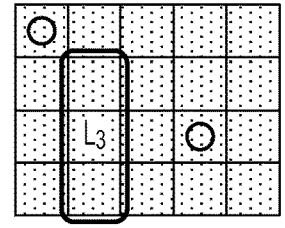
(6) MAKE EXCHANGE OF ROWS FOR $U2_1$ AND $C_1$ USING PIVOT INFORMATION ACQUIRED DURING PANEL FACTORIZATION OF $L_1$
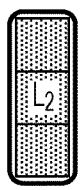 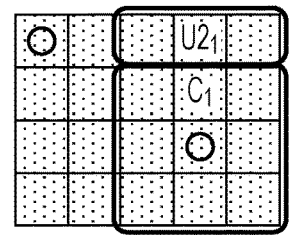
(7) PERFORM UPDATE COMPUTATION OF $U2_1$
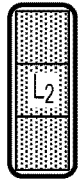 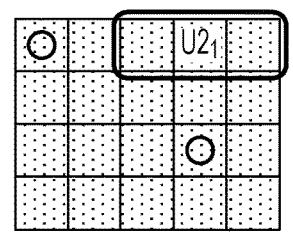
(8) TRANSMIT $L_3$ WHILE PERFORMING MATRIX COMPUTATION $C_1 \leftarrow C_1 - L2_1 U2_1$
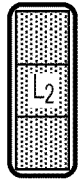 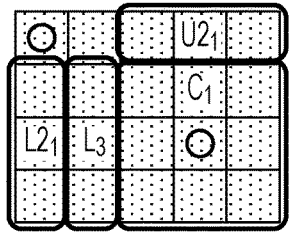
TRANSMIT $L_3$ AND PIVOT INFORMATION ACQUIRED DURING PANEL FACTORIZATION OF $L_3$ TO NODE (0, 1)

FIG. 27
j = 2
(9) PANEL-FACTORIZE $L_4$ (NODE (0, 0) DOES NOTHING)
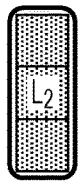 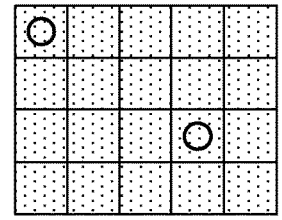
(10) MAKE EXCHANGE OF ROWS FOR $U_2$ AND $C_2$ USING PIVOT INFORMATION ACQUIRED DURING PANEL FACTORIZATION OF $L_2$
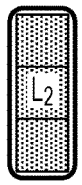 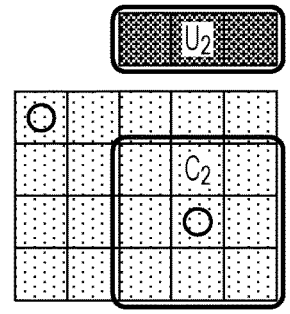
(11) PERFORM UPDATE COMPUTATION OF $U_2$
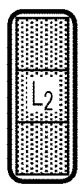 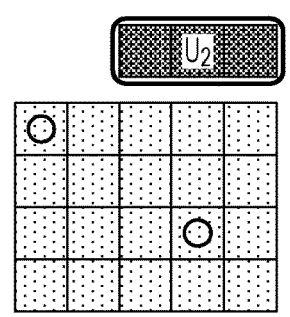
(12) RECEIVE $L_4$ WHILE PERFORMING MATRIX COMPUTATION $C_2 \leftarrow C_2 - L_2 U_2$
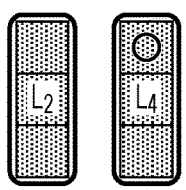 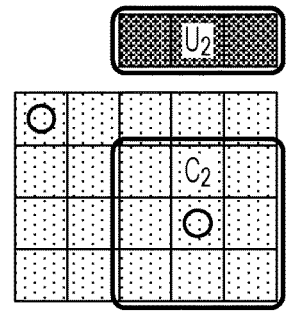
RECEIVE $L_4$ AND PIVOT INFORMATION ACQUIRED DURING PANEL FACTORIZATION OF $L_4$ FROM NODE (0, 1)

FIG. 28
j = 3
(13) PANEL-FACTORIZE $L_5$
 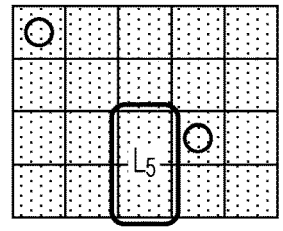
(14) MAKE EXCHANGE OF ROWS FOR $U2_3$ AND $C_3$ USING PIVOT INFORMATION ACQUIRED DURING PANEL FACTORIZATION OF $L_3$
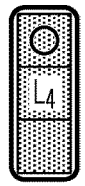 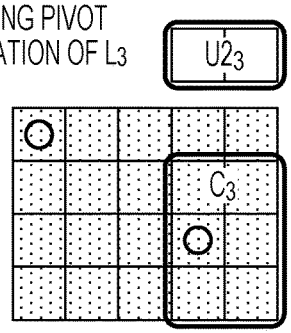
(15) PERFORM UPDATE COMPUTATION OF $U2_3$
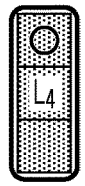 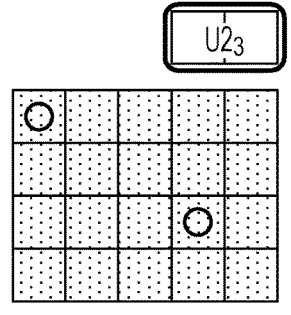
(16) TRANSMIT $L_5$ WHILE PERFORMING MATRIX COMPUTATION $C_3 \leftarrow C_3 - L2_3 U2_3$
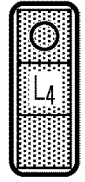 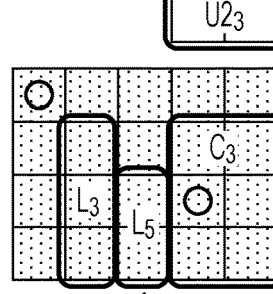
TRANSMIT $L_5$ AND PIVOT INFORMATION ACQUIRED DURING PANEL FACTORIZATION OF $L_5$ TO NODE (0, 1)

FIG. 29
j = 4
(17) PANEL-FACTORIZE $L_6$ (NODE (0, 0) DOES NOTHING)
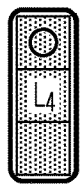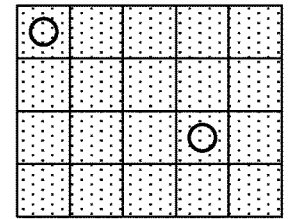
(18) MAKE EXCHANGE OF ROWS FOR $U2_4$ AND $C_4$ USING PIVOT INFORMATION ACQUIRED DURING PANEL FACTORIZATION OF $L_4$
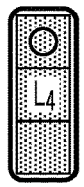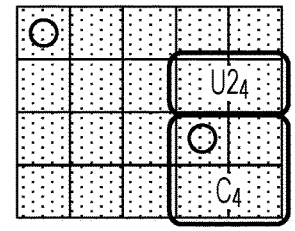
(19) PERFORM UPDATE COMPUTATION OF $U2_4$
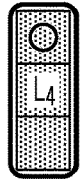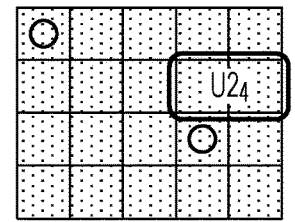
(20) RECEIVE $L_6$ WHILE PERFORMING MATRIX COMPUTATION $C_4 \leftarrow C_4 - L2_4 U2_4$
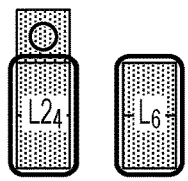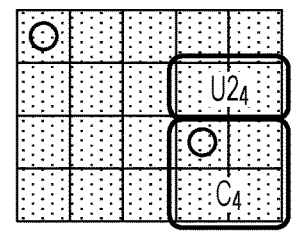
RECEIVE $L_6$ AND PIVOT INFORMATION ACQUIRED DURING PANEL FACTORIZATION OF $L_6$ FROM NODE (0, 1)

FIG. 37
FLOW OF PROCESSES
(1) PANEL-FACTORIZE $L_1$
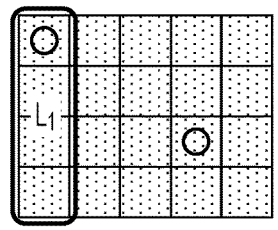
(2) TRANSMIT $L_1$
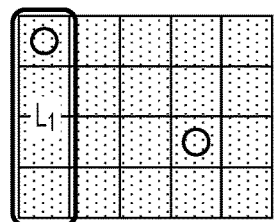
TRANSMIT $L_1$ AND PIVOT INFORMATION ACQUIRED
DURING PANEL FACTORIZATION OF $L_1$ TO NODE (0, 1)
(3) PANEL-FACTORIZE $L_2$
(PERFORMED ONLY BY NODES (*, 1). NODE (0, 0) DOES NOTHING)
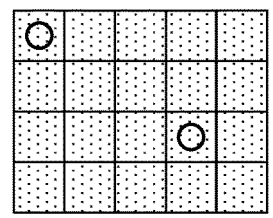
(4) RECEIVE $L_2$
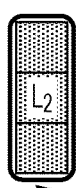 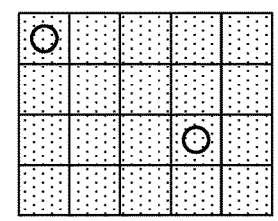
RECEIVE $L_2$ AND PIVOT INFORMATION
ACQUIRED DURING PANEL
FACTORIZATION OF $L_2$ FROM NODE (0, 1)

FIG. 38
j = 1
(5) PANEL-FACTORIZE $L_3$
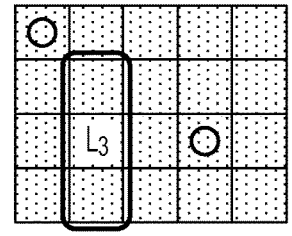
(6) MAKE EXCHANGE OF ROWS FOR $U2_1$ AND $C_1$ USING PIVOT INFORMATION ACQUIRED DURING PANEL FACTORIZATION OF $L_1$
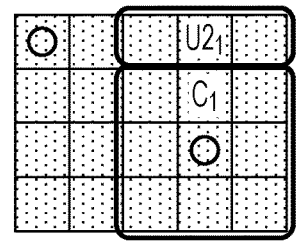
(7) PERFORM UPDATE COMPUTATION OF $U2_1$
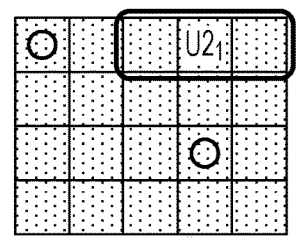
(8) MAKE EXCHANGE OF ROWS FOR $U_2$ AND $C_2$ USING PIVOT INFORMATION ACQUIRED DURING PANEL FACTORIZATION OF $L_2$
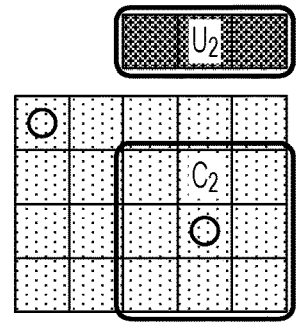

FIG. 39
(9) MAKE EXCHANGE OF ROWS FOR $L2_1$ USING PIVOT INFORMATION ACQUIRED DURING PANEL FACTORIZATION OF $L_2$
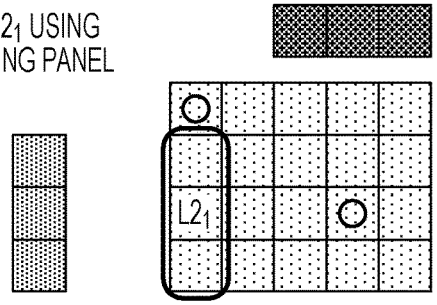
(10) COMPUTE HEAD ROW BLOCK OF $C_1$ (ASSUMED TO BE $C3_1$) USING $C3_1 \leftarrow C3_1 - L3_1 U_1$ IF LENGTH OF $L2_1$ IS LONGER THAN THAT OF $L_2$ (UNNECESSARY IN THIS CASE SINCE LENGTHS ARE EQUAL)
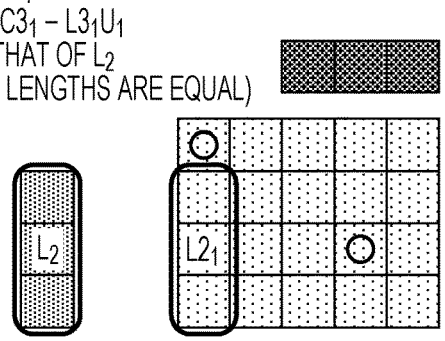
(11) PERFORM UPDATE COMPUTATION OF $U_2$
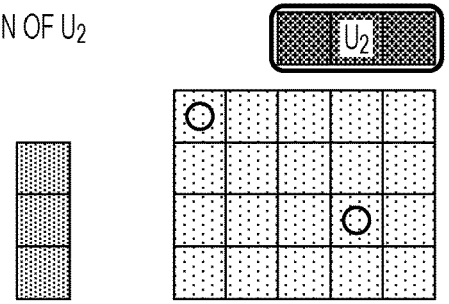
(12) COPY EACH OF L- AND U-PANELS TO ONE WORKING AREA
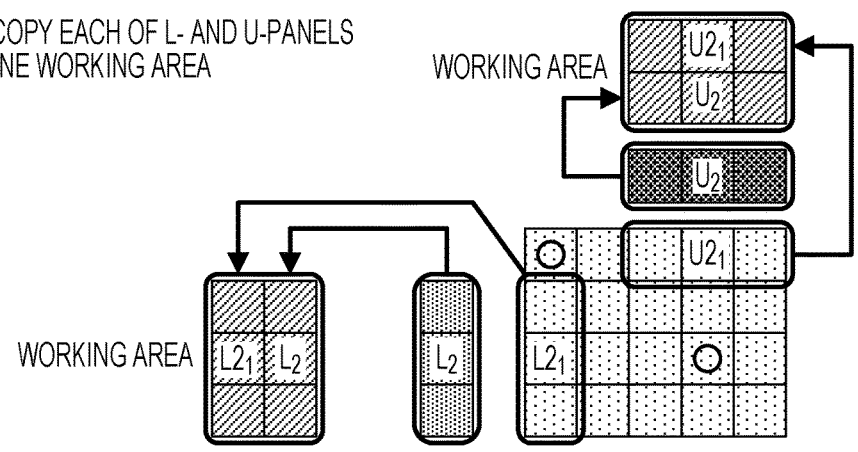

FIG. 40

(13) TRANSMIT $L_3$ WHILE PERFORMING MATRIX COMPUTATION OF UPPER HALF OF $C_2 \leftarrow C_2 - [L2_1 L_2][U2_1 U_2]^T$

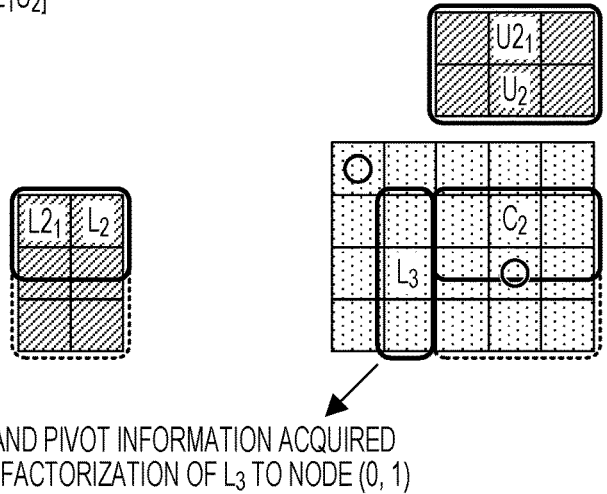

TRANSMIT $L_3$ AND PIVOT INFORMATION ACQUIRED
DURING PANEL FACTORIZATION OF $L_3$ TO NODE (0, 1)

j = 2

(14) PANEL-FACTORIZE $L_4$ (NODE (0, 0) DOES NOTHING)

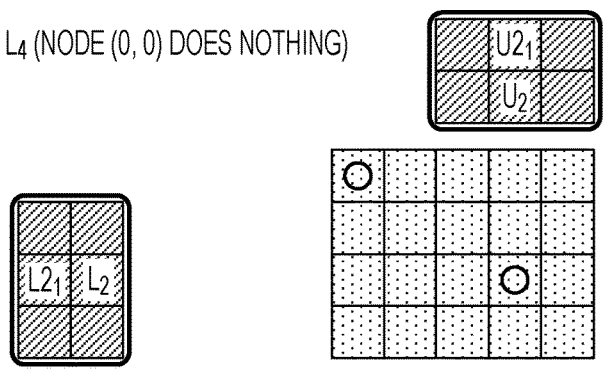

(15) RECEIVE $L_4$ WHILE PERFORMING MATRIX COMPUTATION OF LOWER HALF OF $C_2 \leftarrow C_2 - [L2_1 L_2][U2_1 U_2]^T$

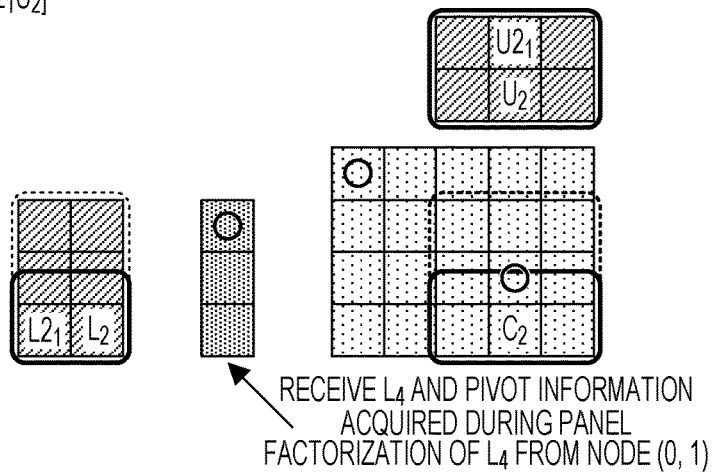

RECEIVE $L_4$ AND PIVOT INFORMATION
ACQUIRED DURING PANEL
FACTORIZATION OF $L_4$ FROM NODE (0, 1)

FIG. 41
$j = 3$
(16) PANEL-FACTORIZE $L_5$
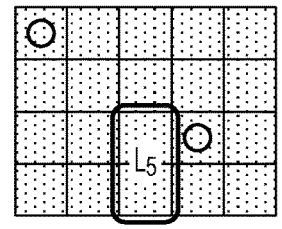
(17) MAKE EXCHANGE OF ROWS FOR $U2_3$ AND $C_3$ USING PIVOT INFORMATION ACQUIRED DURING PANEL FACTORIZATION OF $L_3$
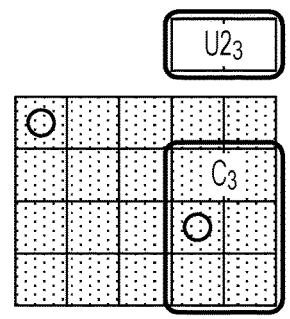
(18) PERFORM UPDATE COMPUTATION OF $U2_3$
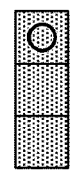
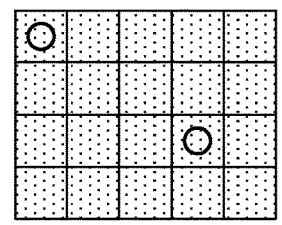
(19) MAKE EXCHANGE OF ROWS FOR $U2_4$ AND $C_4$ USING PIVOT INFORMATION ACQUIRED DURING PANEL FACTORIZATION OF $L_4$
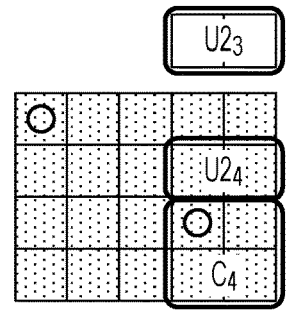

FIG. 42
(20) MAKE EXCHANGE OF ROWS FOR $L_3$ USING PIVOT INFORMATION ACQUIRED DURING PANEL FACTORIZATION OF $L_4$
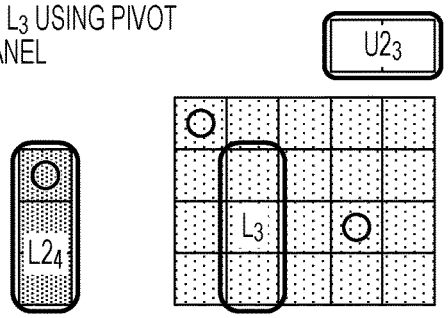
(21) COMPUTE HEAD ROW BLOCK OF $C_3$ (ASSUMED TO BE $C3_3$) USING $C3_3 \leftarrow C3_3 - L3_3 U2_3$ IF LENGTH OF $L_3$ IS LONGER THAN THAT OF $L2_4$
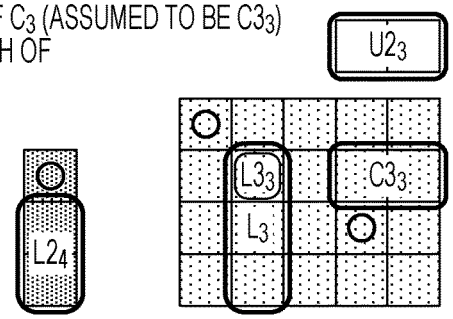
(22) PERFORM UPDATE COMPUTATION OF $U2_4$
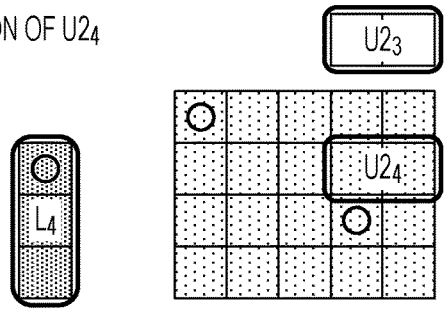
(23) COPY EACH OF L- AND U-PANELS TO ONE WORKING AREA
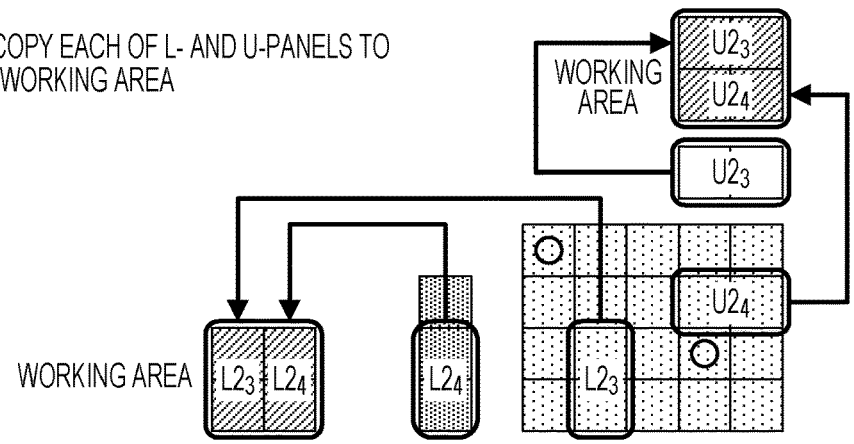

FIG. 43

(24) TRANSMIT $L_5$ WHILE PERFORMING MATRIX COMPUTATION
OF UPPER HALF OF $C_4 \leftarrow C_4 - [L_{23}L_{24}][U_{23}U_{24}]^T$

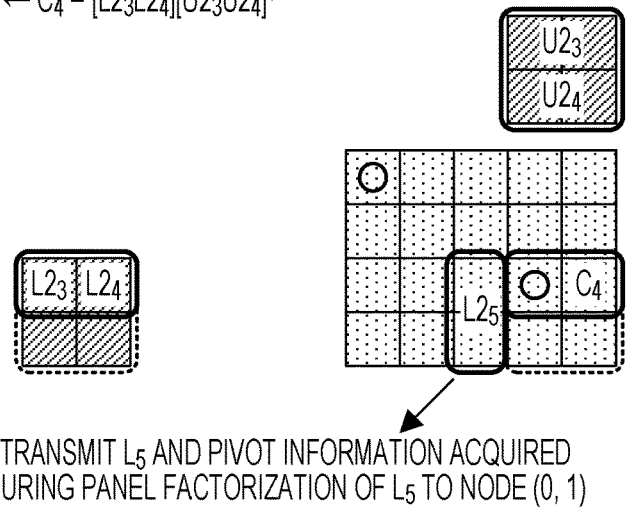

TRANSMIT $L_5$ AND PIVOT INFORMATION ACQUIRED
DURING PANEL FACTORIZATION OF $L_5$ TO NODE (0, 1)

j = 4

(25) PANEL-FACTORIZE $L_6$ (NODE (0, 0) DOES NOTHING)

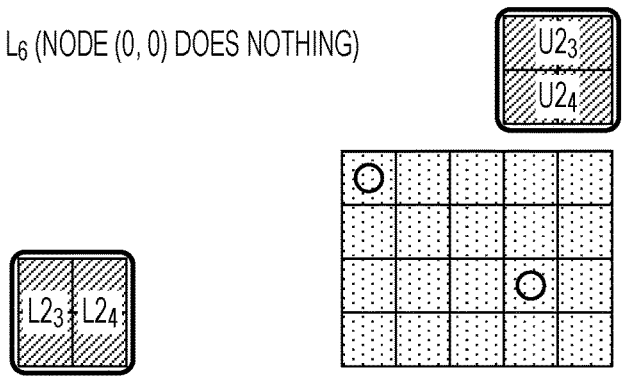

(26) RECEIVE $L_6$ WHILE PERFORMING MATRIX COMPUTATION
OF LOWER HALF OF $C_4 \leftarrow C_4 - [L_{23}L_{24}][U_{23}U_{24}]^T$

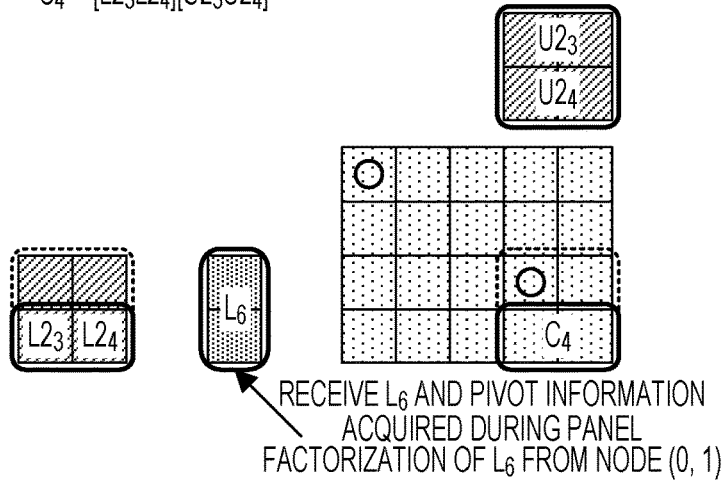

RECEIVE $L_6$ AND PIVOT INFORMATION
ACQUIRED DURING PANEL
FACTORIZATION OF $L_6$ FROM NODE (0, 1)

PARALLEL COMPUTER SYSTEM, PARALLEL COMPUTING METHOD, AND PROGRAM STORAGE MEDIUM

CROSS-REFERENCE TO RELATED APPLICATION

This application is based upon and claims the benefit of priority of the prior Japanese Patent Application No. 2015-112250, filed on Jun. 2, 2015, the entire contents of which are incorporated herein by reference.

FIELD

The embodiment discussed herein is related to a parallel computing technique.

BACKGROUND

The LINPACK benchmark is known as a benchmark for measuring the computational performance of a computer system when solving a set of simultaneous linear equations. Since the LINPACK benchmark is used for the ranking on the TOP500 list, attention has been drawn to a technique to solve at high speed a set of simultaneous linear equations using a computer system. Here, LINPACK itself is a software library for performing numerical computations. Particularly, high-performance LINPACK (HPL) is a library for solving in parallel a set of simultaneous linear equations for a dense matrix using the nodes (for example, processes or processor cores) of a parallel computer system.

In the computation of a set of simultaneous linear equations Ax=b, the matrix A is first factorized into an upper triangular matrix and a lower triangular matrix (this factorization is called the LU factorization), and then x is obtained. In the case of HPL, the matrix A is factorized into blocks of width NB, and processing is executed on a block basis and the LU factorization proceeds. One or more blocks are allocated to each of the nodes.

The LU factorization is described with reference to FIG. 1. In the example of FIG. 1, the matrix A is factorized in 10×10=100 blocks. The number of elements belonging to each of the blocks is assumed to be 100×100=10000. Hence, NB=100, and the matrix A has (100×10)×(100×10)=1000000 elements. A block denoted with a circle contains a diagonal element of the matrix, and the part above the blocks denoted with circles corresponds to the upper triangle while the part below the blocks denoted with circles corresponds to the lower triangle.

In the example of FIG. 1, the blocks of the matrix A are allocated to six nodes, and blocks allocated to the same node have the same color. The allocation of the blocks is described with reference to FIG. 2. In the example of FIG. 2, the blocks of the matrix A are allocated to the nodes (0, 0), (0, 1), (1, 0), (1, 1), (2, 0), and (2, 1), and parts of the matrix A allocated to each node are stored as a local array in a memory or other storage devices. Here, the number of blocks allocated is non-uniform among the nodes. Specifically, the number of blocks allocated to the node (0, 0) or (0, 1) is 20, whereas the number of blocks allocated to each of the nodes (1, 0), (1, 1), (2, 0), and (2, 1) is 15.

When performing LU factorization, the computational efficiency for matrix products increases as the width of a submatrix for the computation of matrix products increases (that is, as the block size increases), and thus processing time is reduced. However, increasing the block size causes the number of blocks allocated to be non-uniform among the nodes as illustrated in FIG. 2, and deteriorates load balancing. Hence, it is not possible to simply increase the block size. In the related art, the above-mentioned problem is not fully considered.

Examples of the related art are disclosed, for example, in International Publication Pamphlet No. WO2008/136045, Japanese Laid-open Patent Publication Nos. 2008-176738, 2000-339295, and 2006-85619.

Hence, in one aspect, an object of the present disclosure is to provide a technique for reducing processing time to solve a set of simultaneous linear equations using a parallel computer system.

SUMMARY

According to an aspect of the invention, a parallel computer system including a plurality of processors configured to perform LU factorization in parallel, the system is configured to cause each of the plurality of processors to execute processing including: generating a first panel by integrating a plurality of row panels among panels of a matrix to be subjected to the LU-factorization, the plurality of row panels being processed by the processor, generating a second panel by integrating a plurality of column panels among the panels of the matrix, the plurality of column panels being processed by the processor, and computing a matrix product of the first panel and the second panel. In parallel with the computation of the matrix product, each processor is configured to receive or transmit a column panel to be used for computation of a subsequent matrix product from or to another processor among the plurality of processors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram for explaining update computation;

FIG. 20 is a diagram for explaining remaining processing;

FIG. 25 is a diagram illustrating a specific example of the LU factorization with use of Look-ahead;

FIG. 26 is a diagram illustrating the specific example of the LU factorization with use of Look-ahead;

FIG. 27 is a diagram illustrating the specific example of the LU factorization with use of Look-ahead;

FIG. 28 is a diagram illustrating the specific example of the LU factorization with use of Look-ahead;

FIG. 29 is a diagram illustrating the specific example of the LU factorization with use of Look-ahead;

FIG. 37 is a diagram illustrating a specific example of the LU factorization in the embodiment;

FIG. 38 is a diagram illustrating the specific example of the LU factorization in the embodiment;

FIG. 39 is a diagram illustrating the specific example of the LU factorization in the embodiment;

FIG. 40 is a diagram illustrating the specific example of the LU factorization in the embodiment;

FIG. 41 is a diagram illustrating the specific example of the LU factorization in the embodiment;

FIG. 42 is a diagram illustrating the specific example of the LU factorization in the embodiment;

FIG. 43 is a diagram illustrating the specific example of the LU factorization in the embodiment;

DESCRIPTION OF EMBODIMENT

Figure 1:
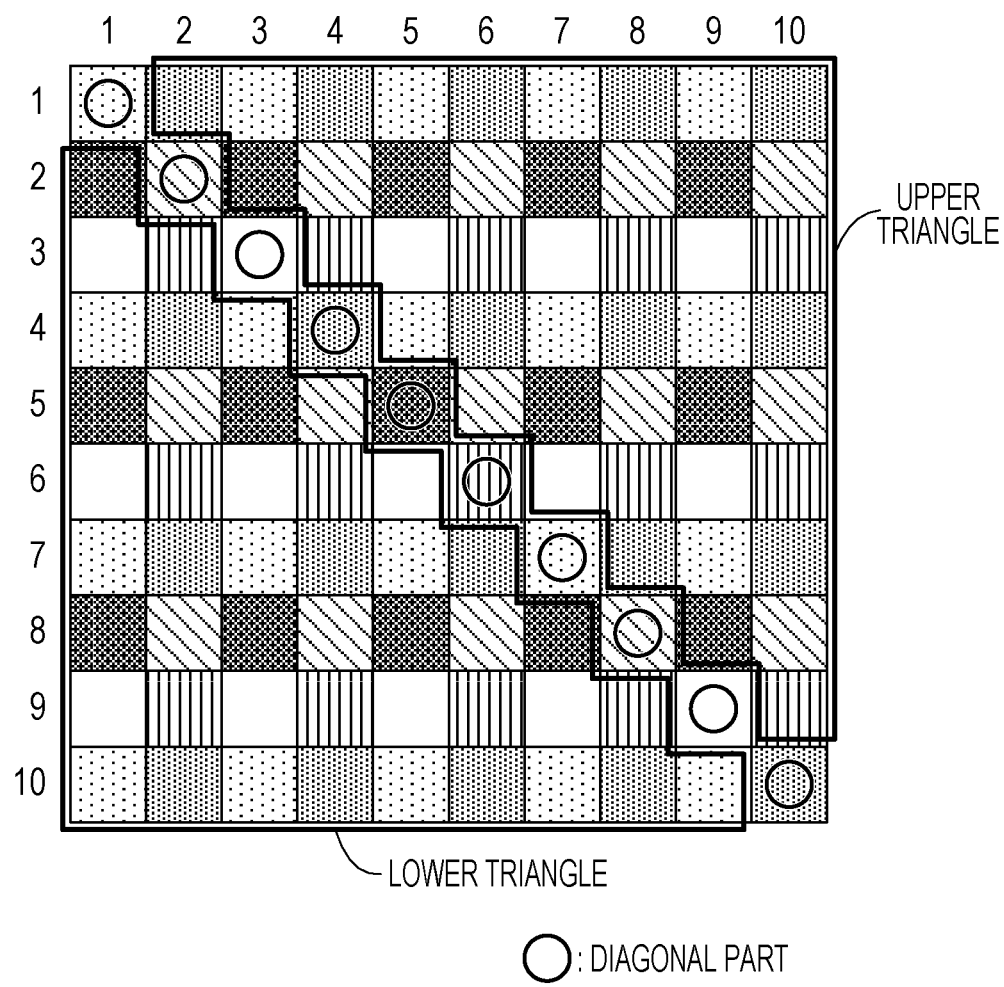
FIG. 1 is a diagram for explaining LU factorization.
Figure 2:
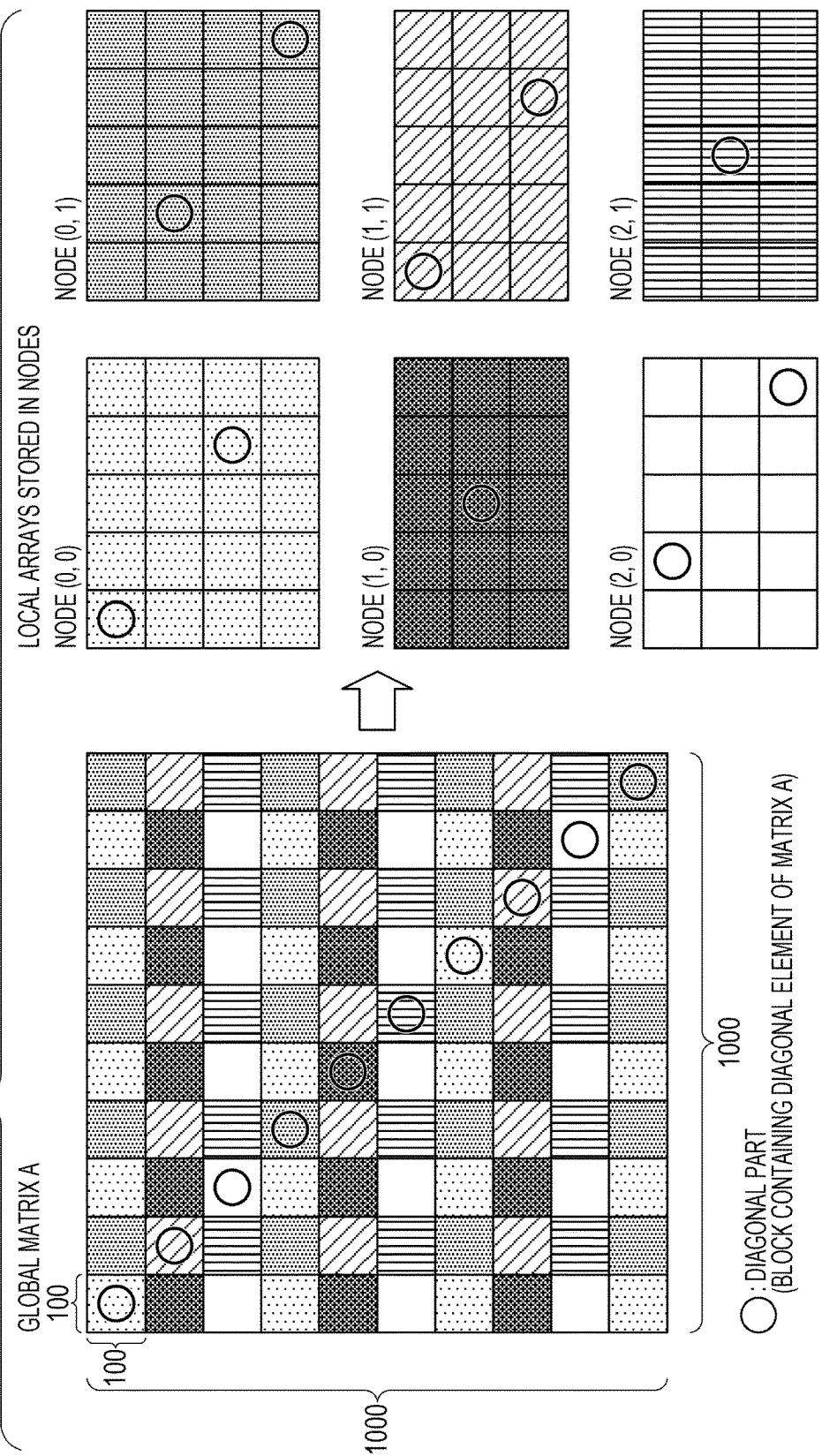
FIG. 2 is a diagram for explaining the LU factorization.
Figure 3:
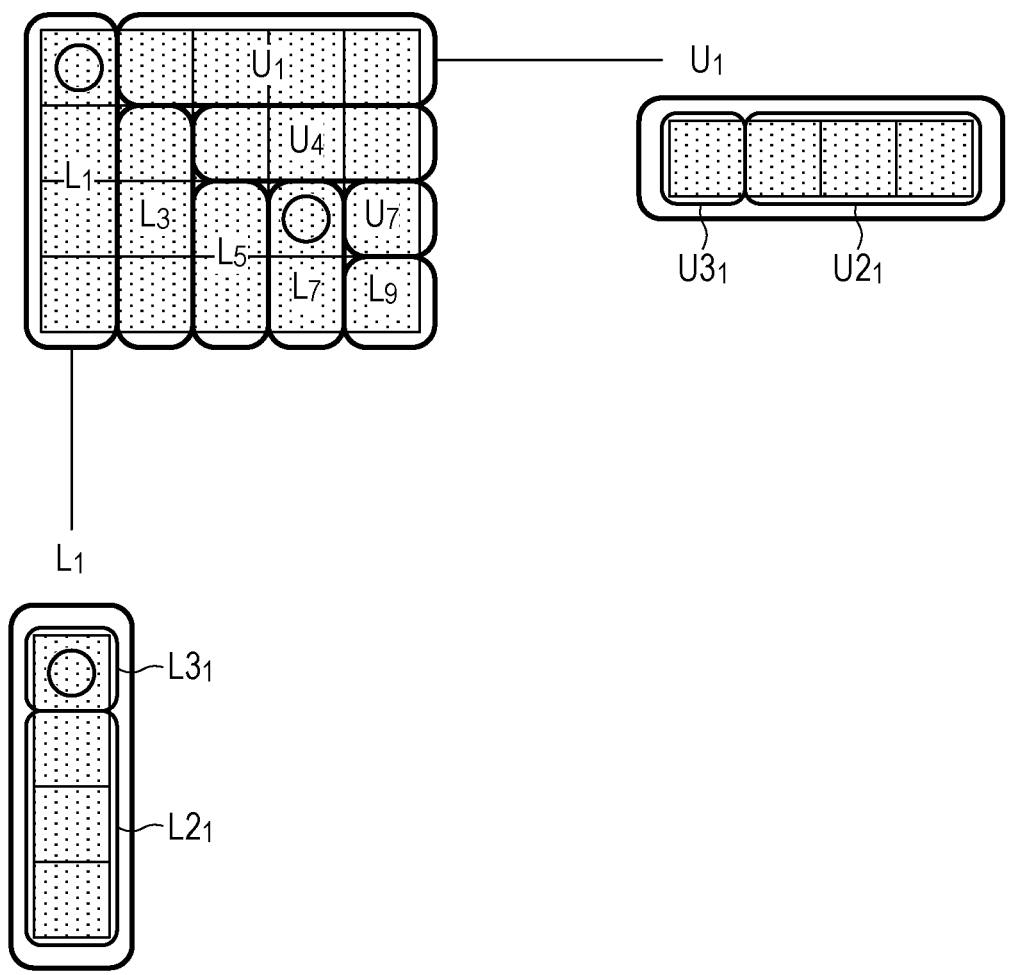
FIG. 3 is a diagram for explaining notation used in an embodiment.

The notation used in the following is described with reference to FIGS. 3 to 6. FIG. 3 illustrates blocks allocated to a node (0, 0) as well as U-panels and L-panels in the blocks, in the case where the blocks are allocated to each node as in FIG. 2. As illustrated in FIG. 3, the U-panel is a collection of blocks in a row direction contained in the upper triangular part of the matrix A. The U-panel on the k-th row of the matrix A is represented as $U_k$. In $U_k$, the part corresponding to the head block is represented as $U3_k$, and the part left when $U3_k$ is removed from $U_k$ is represented as $U2_k$. In the following, a collection of blocks is also called a submatrix. The U-panel is also called a row panel, and the L-panel is also called a column panel.

The L-panel is a collection of blocks in a column direction contained in the part including the lower triangular part and the diagonal parts (if the node contains) of the matrix A. The L-panel on the k-th column of the matrix A is represented as $L_k$. In $L_k$, the part corresponding to the head block is represented as $L3_k$, and the part left when $L3_k$ is removed from $L_k$ is represented as $L2_k$.

Figure 4:
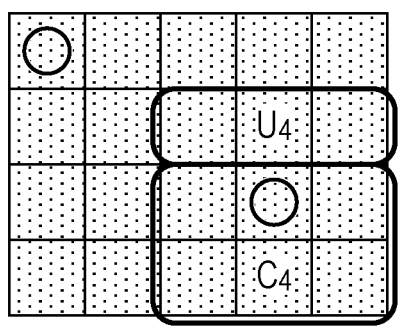
FIG. 4 is a diagram for explaining the notation used in the embodiment.

As illustrated in FIG. 4, the submatrix corresponding to the part below $U_k$ is represented as $C_k$. The submatrix corresponding to the part below $U2_k$ is also represented as $C_k$.

Figure 5:
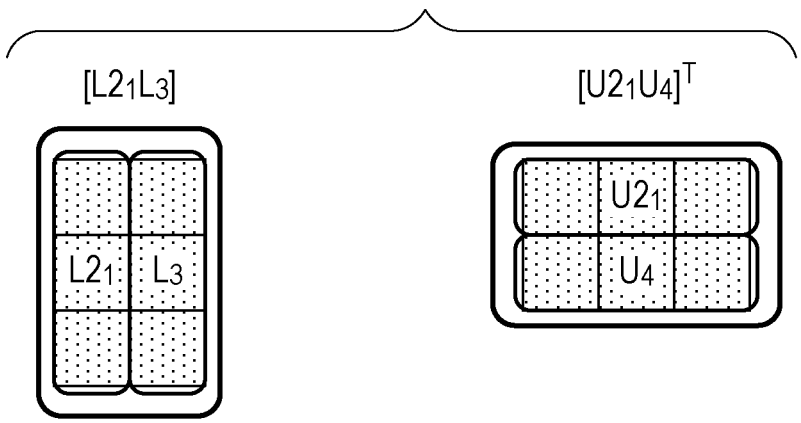
FIG. 5 is a diagram for explaining the notation used in the embodiment.

As illustrated in FIG. 5, a matrix formed by concatenating submatrices is represented with brackets. For example, a matrix formed by concatenating $L_j$ and $L_{j+1}$ in the row direction is represented as $[L_j L_{j+1}]$, and a matrix formed by concatenating $U_j U_{j+1}$ in the column direction is represented as $[U_j U_{j+1}]^T$.

Figure 6:
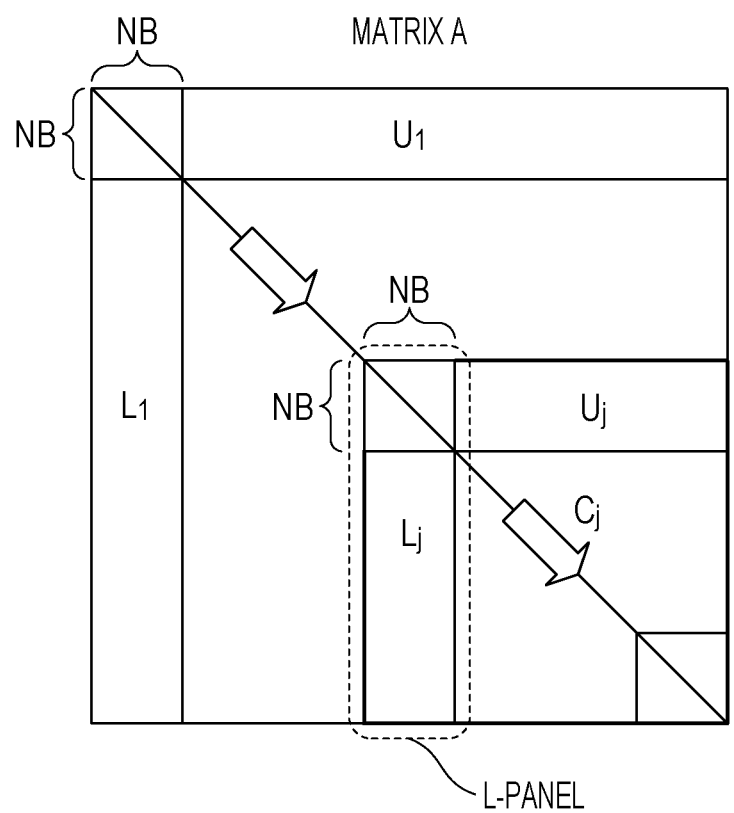
FIG. 6 is a diagram for explaining the notation used in the embodiment.

FIG. 6 illustrates the entire matrix A to be LU-factorized. Although the matrix A is factorized into blocks of width NB and the blocks are allocated to the nodes, LU factorization proceeds in the direction indicated by the arrows as a whole. Accordingly, in LU factorization, communication is performed to exchange elements between nodes.

Figure 7:
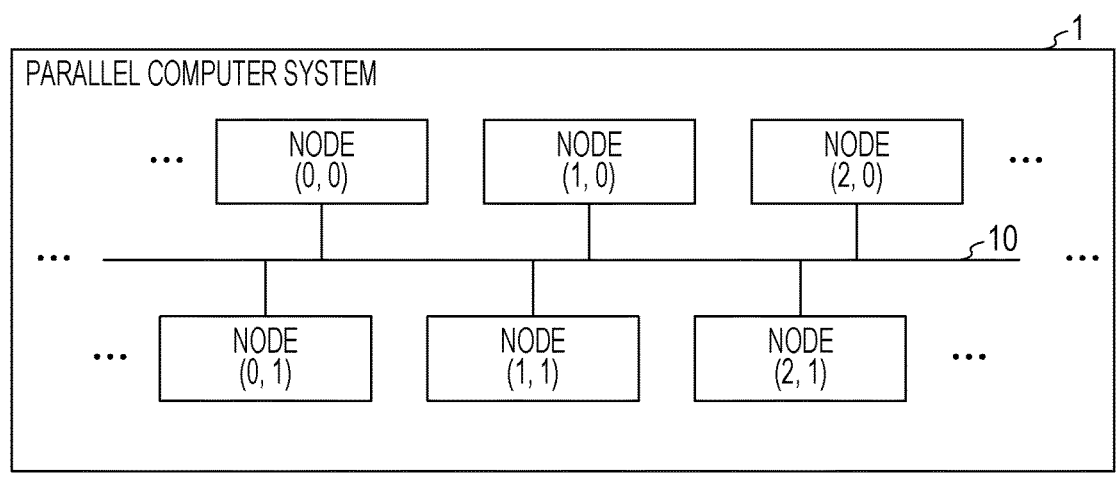
FIG. 7 is a diagram illustrating an overview of a parallel computer system.

FIG. 7 illustrates an overview of a parallel computer system 1. The parallel computer system 1 includes a plurality of nodes and an interconnect 10. Each of the nodes is assigned coordinates. Here, the coordinates may indicate other than the actual physical position, and are identification information assigned to identify a node during execution of LU factorization. The interconnect 10 is not limited to the form illustrated in FIG. 7. Each node is allowed to communicate with other nodes via the interconnect 10.

Figure 8:
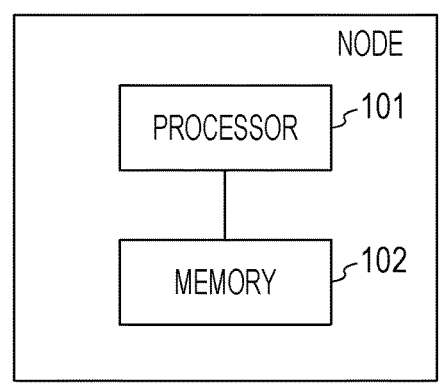
FIG. 8 is a hardware configuration diagram of a node.

FIG. 8 illustrates the hardware configuration of the node. The node includes a processor 101 and a memory 102. The processor 101 and the memory 102 are connected by a bus. The processor 101 is, for example, a central processing unit (CPU). The memory 102 is, for example, a main memory. Here, the node may include other types of hardware (for example, external storage devices), but the explanation thereof is omitted since they are not related to the main part of the embodiment. Also, although the example is given here in which the node is an information processing device, the node may be a processor, a processor core, a process, or the like.

Figure 9:
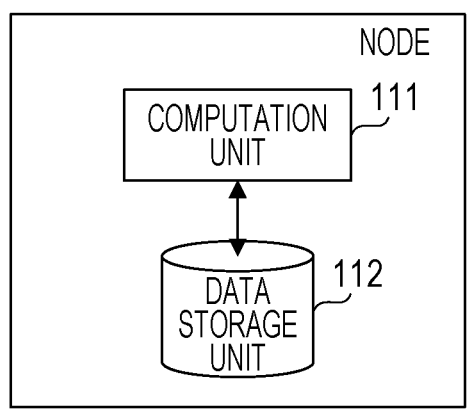
FIG. 9 is a functional block diagram of a node.

FIG. 9 illustrates a functional block diagram of the node. The node includes a computation unit 111 and a data storage unit 112. The processor 101 loads a program stored in an external storage device or the like into the memory 102, and executes the program, thereby implementing the computation unit 111. The data storage unit 112 is provided in, for example, the memory 102.

[LU Factorization by HPL]

First, LU factorization by an ordinary HPL is described with reference to FIGS. 10 to 20. To facilitate the understanding of the explanation, the following description gives an example in which the matrix A is processed with six nodes as illustrated in FIG. 2. Here, the explanation is given of the parts related to the main part of the embodiment, and the explanation of the other parts is simplified or omitted. For details of LU factorization by an ordinary HPL, refer to A. Petitet, R. C. Whaley, J. Dongarra, A. Cleary, "HPL—A Portable Implementation of the High-Performance Linpack Benchmark for Distributed-Memory Computers", [searched on May 1, 2015], on the Internet.

Figure 10:
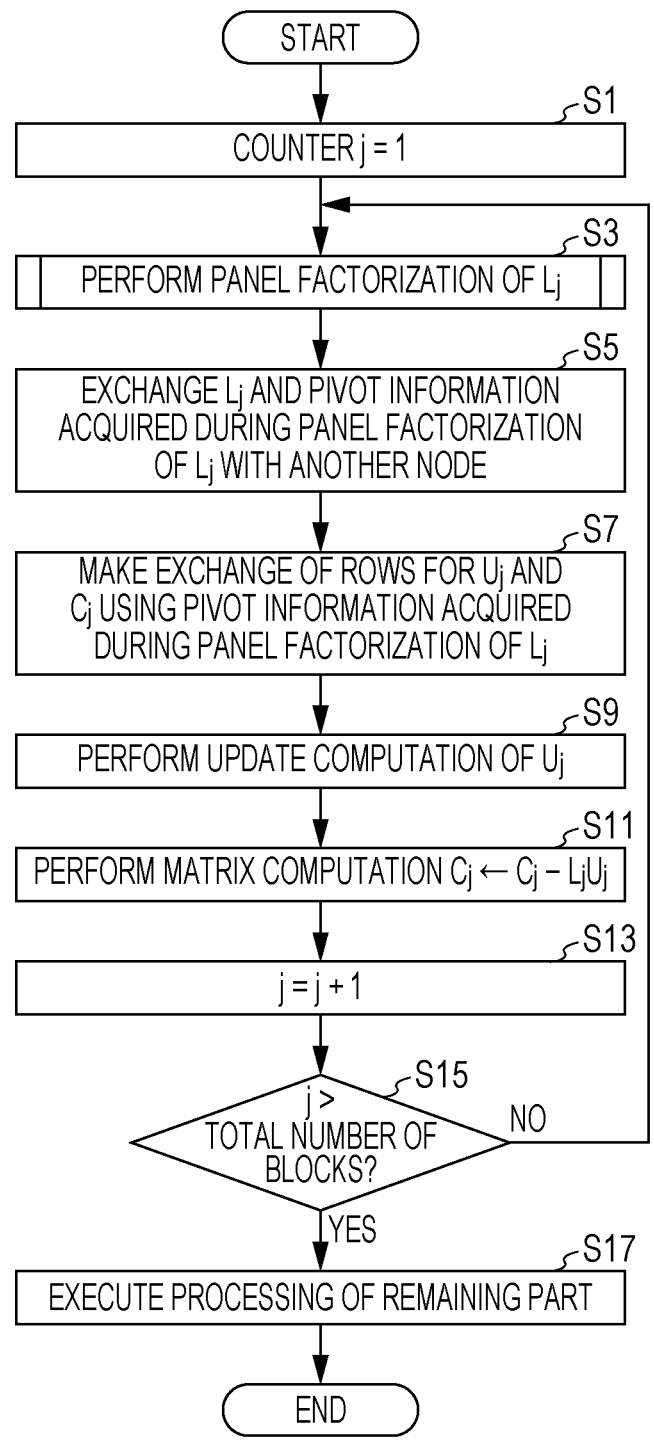
FIG. 10 is a flowchart illustrating processing executed by the parallel computer system.

FIG. 10 is a flowchart of the entire processing. Here, the processing executed in the parallel computer system 1 is complicated (for example, each node may or may not execute processing depending on the value of j), and thus it is difficult to grasp the overview of the processing even if the explanation is given of the processing executed by each node. In the embodiment, therefore, the explanation is given assuming that the parallel computer system 1 executes the process at each of the steps. Note that the process at each step is actually executed by the computation unit 111 of the corresponding node.

First, the parallel computer system 1 sets a counter j for counting the number of blocks such that j=1 (FIG. 10: step S1).

The parallel computer system 1 performs panel factorization of $L_j$ (step S3). The panel factorization is a process to factorize panels in the column direction. Explanation of the panel factorization of $L_j$ is given with reference to FIGS. 11 to 13.

Figure 11:
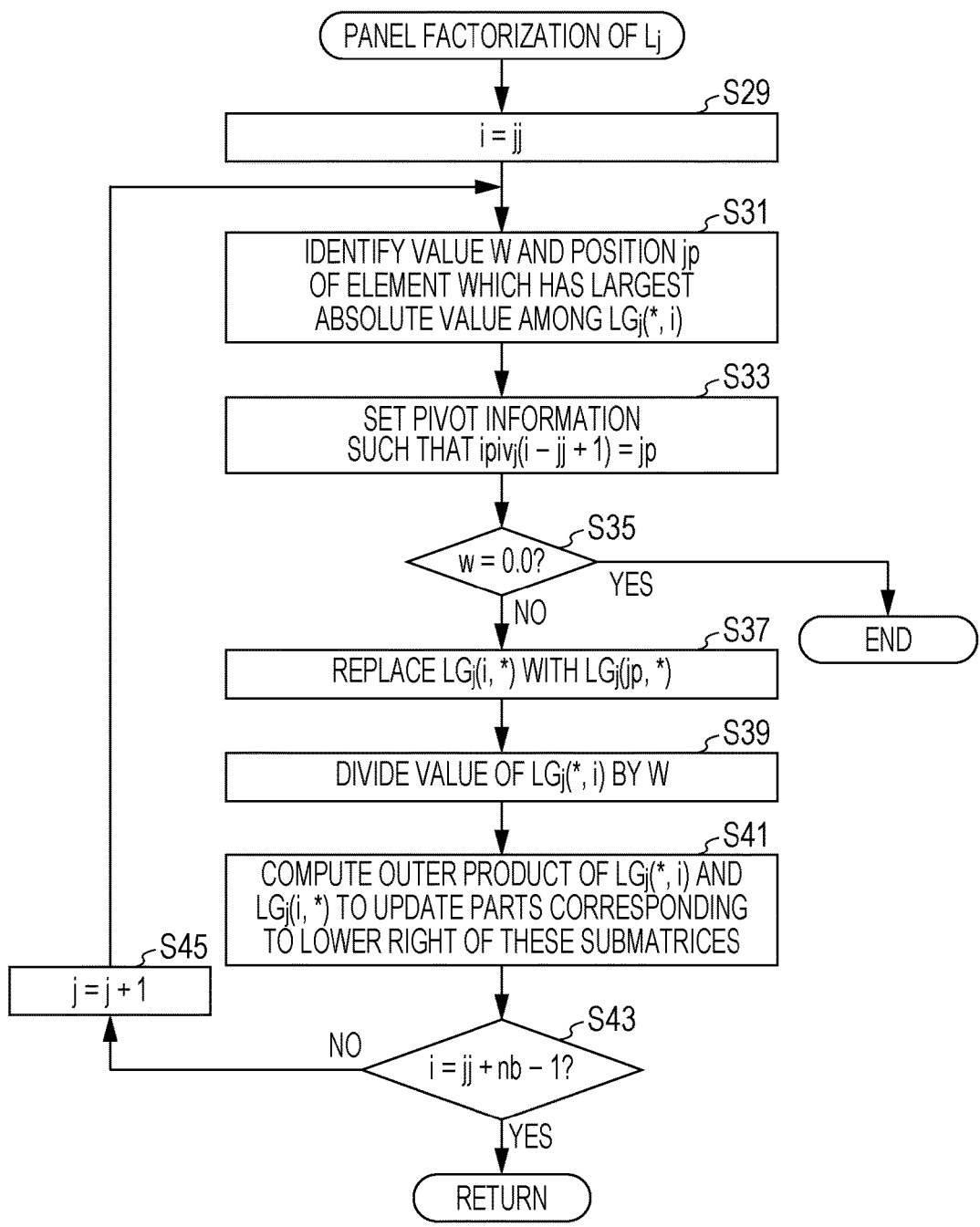
FIG. 11 is a flowchart illustrating processing of panel factorization.
Figure 12:
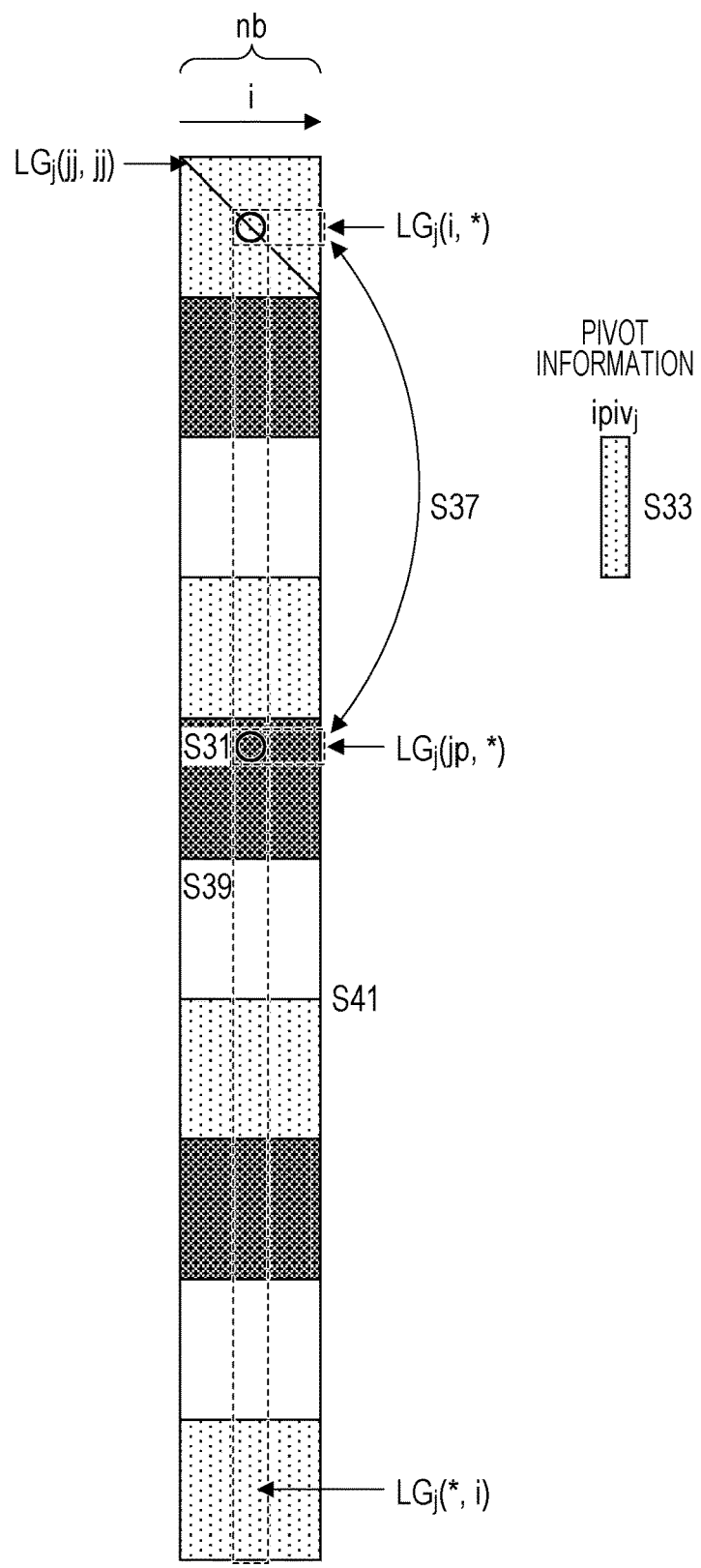
FIG. 12 is a diagram for explaining a global array.

First, to facilitate the understanding of explanation of steps S29 to S45 in FIG. 11, a global array is defined with reference to FIG. 12. Here, the original global array obtained by concatenating $L_j$ belonging to the column nodes is denoted by $LG_j$. The element on the upper left corner of the block located at the top is denoted by $LG_j(jj, jj)$, where $jj=(j-1)*nb+1$. The width of each of the blocks is denoted by nb, position in the column direction by i, and pivot information by $ipiv_j$.

The parallel computer system 1 sets i=jj (FIG. 11: step S29), and identifies the value W and the position jp of the element which has the largest absolute value among $LG_j$(*, i) (step S31), where * is a wildcard character. At step S31, W and jp are identified by performing communication between nodes in the column direction.

Figure 13:
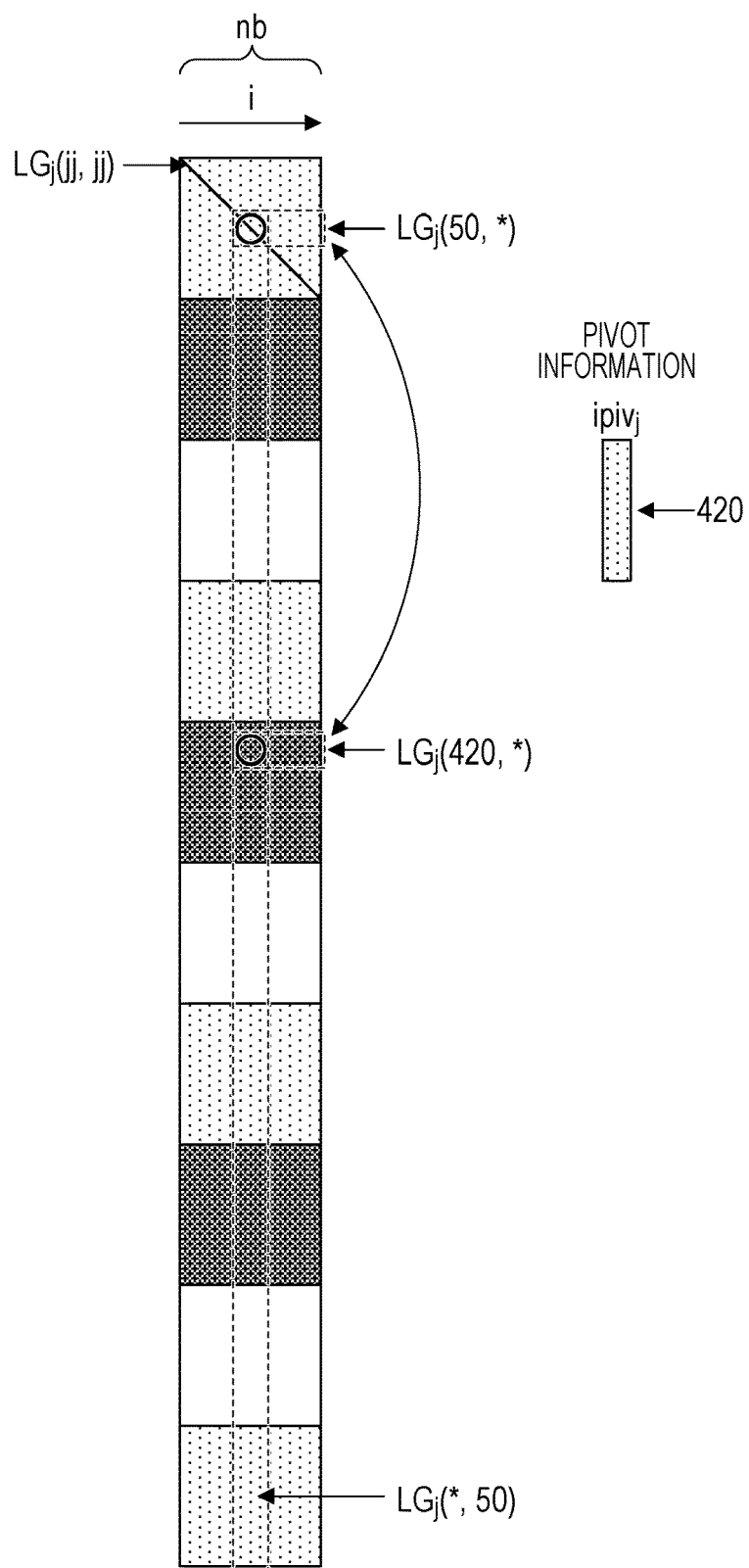
FIG. 13 is a diagram illustrating an example of pivot information.

The parallel computer system 1 sets the pivot information such that $ipiv_j(i-jj+1)=jp$ (step S33). In the pivot information, the row number jp of the row which has been exchanged for the i-th row is set. As illustrated in FIG. 13, in the case of i=50, the pivot information is set such that $ipiv_j(50)=420$ when the row number of the row which has been exchanged for the i-th row is 420. The storage area for the pivot information is provided on the data storage unit 112.

The parallel computer system 1 determines whether or not W=0.0 is satisfied (step S35). If W=0.0 is satisfied (step S35: Yes route), it is not possible to perform LU factorization, and thus the processing terminates. On the other hand, if W=0.0 is not satisfied (step S35: No route), the parallel computer system 1 replaces $LG_j(i, *)$ with $LG_j(jp, *)$ (step S37). At step S37, the replacement is possible without performing communication in the column direction if both of $LG_j(i, *)$ and $LG_j(jp, *)$ belong to the same node. However, the replacement is made by performing communication in the column direction if $LG_j(i, *)$ and $LG_j(jp, *)$ do not belong to the same node.

The parallel computer system 1 divides the value of $LG_j(*, i)$ by W (step S39), and computes the outer product of $LG_j(*, i)$ and $LG_j(i, *)$ to update the parts corresponding to the lower right of these submatrices (step S41).

The parallel computer system 1 determines whether or not i=jj+nb−1 is satisfied (step S43). If i=jj+nb−1 is not satisfied (step S43: No route), the parallel computer system 1 increments i by 1 (step S45), and the processing returns to that of step S31. On the other hand, if i=jj+nb−1 is satisfied (step S43: Yes route), the processing returns to that of the caller.

Figure 14:
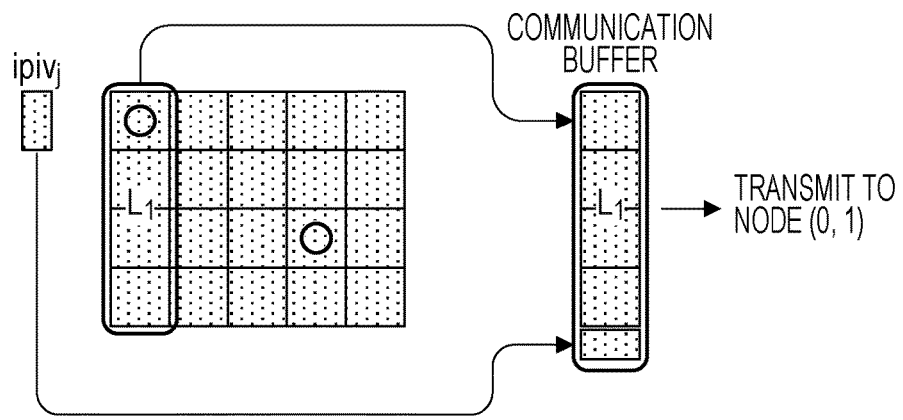
FIG. 14 is a diagram for explaining exchange of a panel and pivot information.

The description goes back to FIG. 10. Each of the nodes in the parallel computer system 1 exchanges $L_j$ and pivot information acquired during panel factorization of $L_j$ with another node (step S5). The communication performed at step S5 is communication in the row direction. As illustrated in FIG. 14, for example, a case is considered in which the node (here, node (0, 0)) is a root node (the node retaining the $L_j$-panel). In this case, the $L_j$-panel and the pivot information ($ipiv_j$) acquired during panel factorization of $L_j$ are copied to the communication buffer in the data storage unit 112, and then are transmitted to the subsequent node (here, node (0, 1)).

Figure 15:
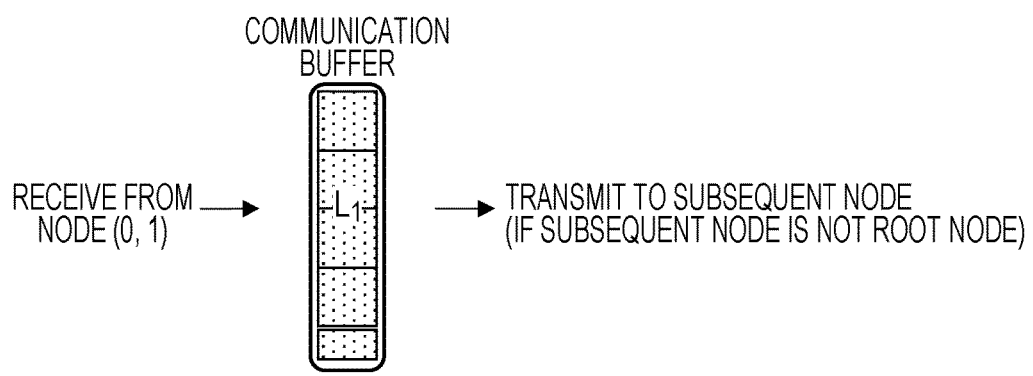
FIG. 15 is a diagram for explaining the exchange of a panel and pivot information.

On the other hand, if the node (here, node (0, 0)) is not a root node, the $L_j$-panel and the pivot information ($ipiv_j$) acquired during panel factorization of $L_j$ are received from another node (here, node (0, 1)), and are stored in the communication buffer, as illustrated in FIG. 15. Then, the node (0, 0) transmits to the subsequent node the $L_j$-panel and the pivot information ($ipiv_j$) acquired during panel factorization of $L_j$, which are stored in the communication buffer. Assume that the subsequent node is not a root node. In such a manner, each node is made to retain the $L_j$-panel and the pivot information ($ipiv_j$) acquired during panel factorization of $L_j$.

The parallel computer system 1 makes an exchange of rows for $U_j$ and $C_j$ using the pivot information acquired during panel factorization of $L_j$ (step S7). Communication is performed also at step S7, and is communication in the column direction.

Figure 16:
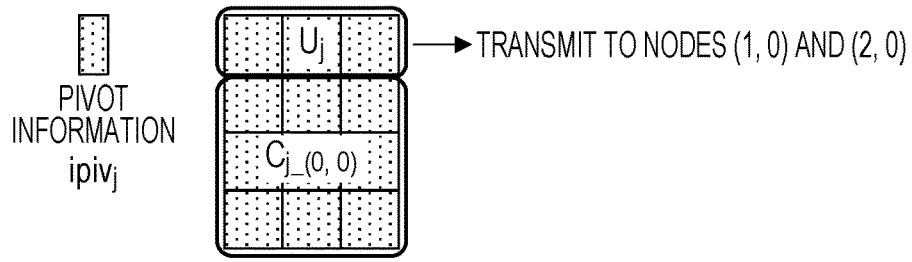
FIG. 16 is a diagram for explaining exchange of rows.
Figure 17:
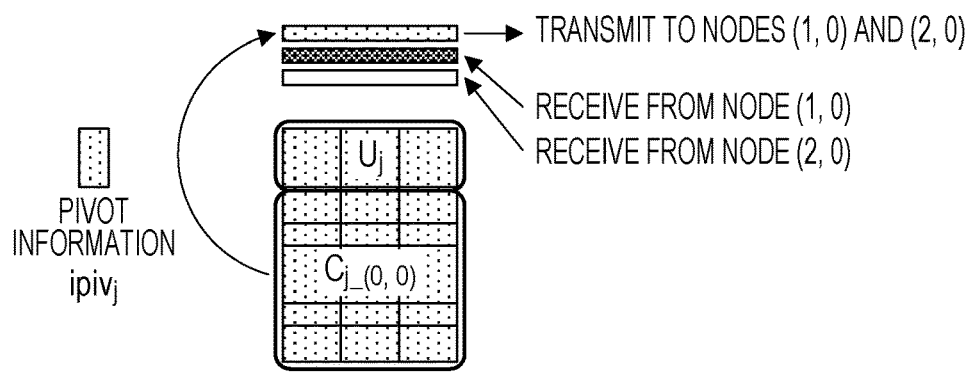
FIG. 17 is a diagram for explaining the exchange of rows.

Exchange of rows at step S7 is described with reference to FIGS. 16 to 18. First, as illustrated in FIG. 16, the node (assumed to be node (0, 0)) transmits $U_j$ to nodes (here, node (1, 0) and node (2, 0)) on the same column. Note that, if another node retains $U_j$, the node (0, 0) receives $U_j$ from that node. In FIG. 16, $C_{j\_(0, 0)}$ is $C_j$ of the node (0, 0).

In $ipiv_j$, the global row numbers of the rows to be exchanged for the i-th row of $U_j$ are set. As illustrated in FIG. 17, the node (0, 0) collects the elements of the rows retained by the node (0, 0) from the rows to be exchanged for the i-th row of $U_j$, and transmits the collected elements to the nodes (1, 0) and (2, 0). In addition, the node (0, 0) receives the elements of the rows to be exchanged which are retained by other nodes.

Figure 18:
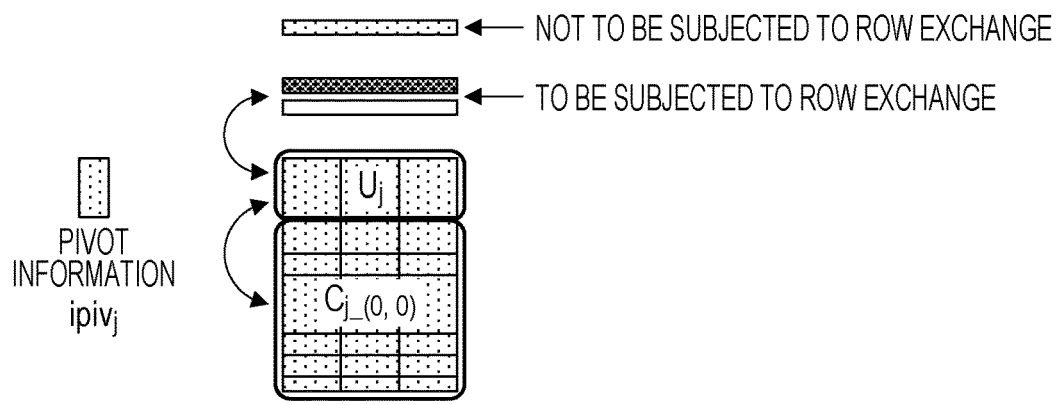
FIG. 18 is a diagram for explaining the exchange of rows.

Then, as illustrated in FIG. 18, the node (0, 0) makes exchange of a row in $U_j$ and the rows to be exchanged.

Thereafter, the parallel computer system 1 performs update computation of $U_j$ (step S9). Note that communication in the column direction is performed prior to the processing at step S9.

The update computation of $U_j$ is described with reference to FIG. 19. In the update computation of $U_j$, a set of simultaneous linear equations $L3^L_j X=U_j$ is solved, and the original $U_j$ is replaced by X, where $L3^L_j$ corresponds to a lower triangular matrix containing the lower triangular part in the head block of $L_j$, and elements in the diagonal parts of $L3^L_j$ are set to 1.0. Since $L3^L_j$ is a lower triangular matrix, it suffices to perform back substitutions for the columns of $U_j$.

The parallel computer system 1 performs the matrix computation $C_j \leftarrow C_j - L_j U_j$ (step S11), and increments the counter j by 1 (step S13).

The parallel computer system 1 determines whether or not j>(total number of blocks) is satisfied (step S15). The total number of blocks is the number of blocks both in the row direction and in the column direction. If j>(total number of blocks) is not satisfied (step S15: No route), the processing returns to that of step S3 for the subsequent j. On the other hand, if j>(total number of blocks) is satisfied (step S15: Yes route), the parallel computer system 1 processes the remaining part of the matrix A (step S17), and then terminates the processing.

Assume, for example, that N is indivisible by NB, where N represents the number of rows and the number of columns of the square matrix A. Then, as illustrated in FIG. 20, an M×M submatrix (M=mod(N, NB)) is left as a remainder of the matrix A. If N=1050 and NB=100, for example, a 50×50 submatrix is left in the node (1, 0). At step S17, the remaining part is LU-factorized by the processes at steps S29 to S45 in FIG. 11. Note that since the remaining part belongs to a single node, communication between nodes is not performed.

[LU Factorization with Use of Look-Ahead]

Basic processing content of LU factorization has been described above, and it is also possible to perform LU factorization with use of a technique called "Look-ahead". This method performs communication and matrix computation in parallel and thus makes it possible to reduce processing time of LU factorization. In the following, a method of performing LU factorization with use of Look-ahead is described with reference to FIGS. 21 to 29.

Figure 21:
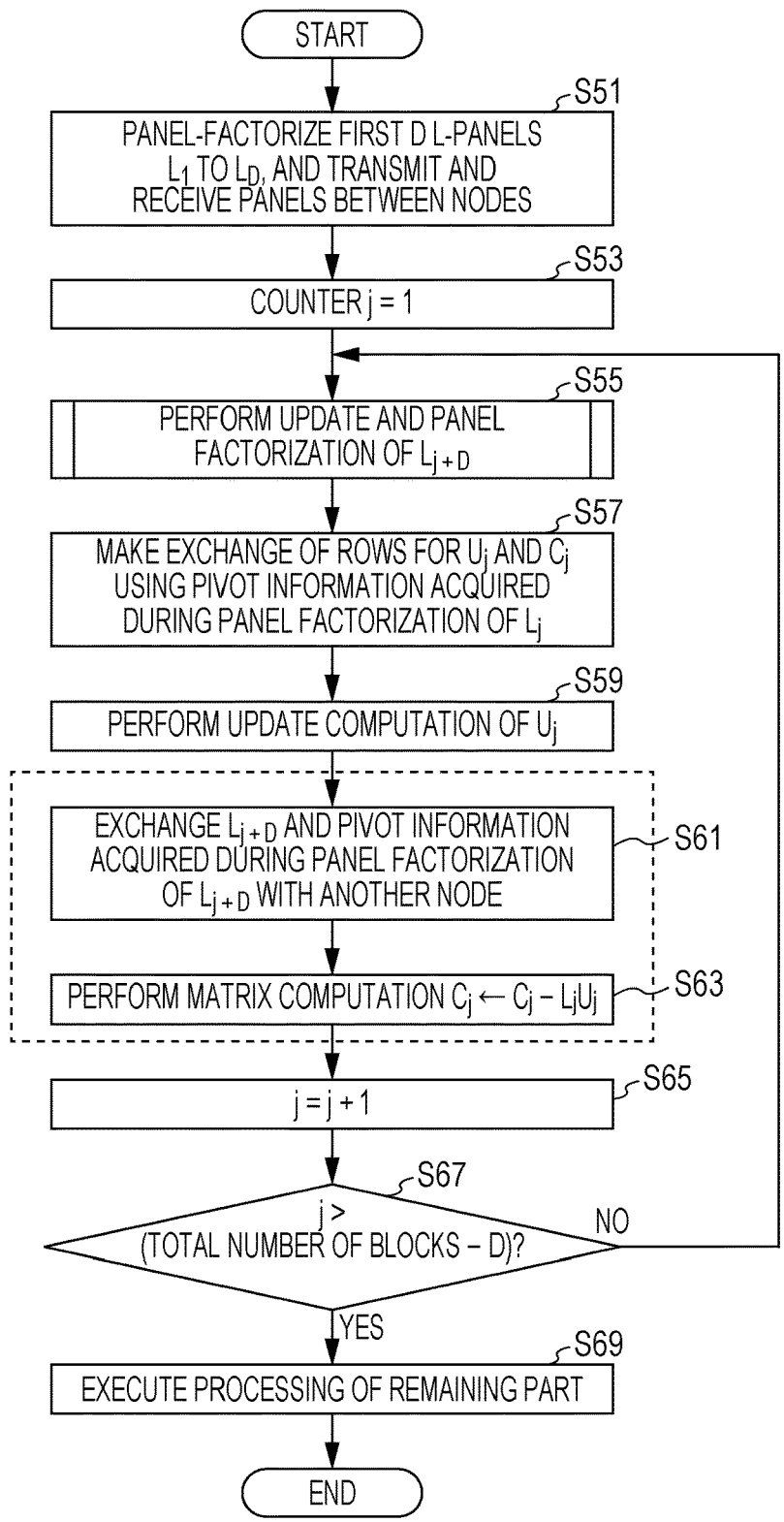
FIG. 21 is a flowchart illustrating processing of LU factorization with use of Look-ahead.

First, the parallel computer system 1 panel-factorizes the first D L-panels $L_1$ to $L_D$ (where D is the depth of Look-ahead), and transmits and receives panels between nodes (FIG. 21: step S51).

The parallel computer system 1 sets the counter j for counting the number of blocks such that j=1 (step S53).

The parallel computer system 1 performs update and panel factorization of $L_{j+D}$ (step S55). The panel factorization is the same as that at step S3. Explanation on the update is given with reference to FIGS. 22 to 23.

Figure 22:
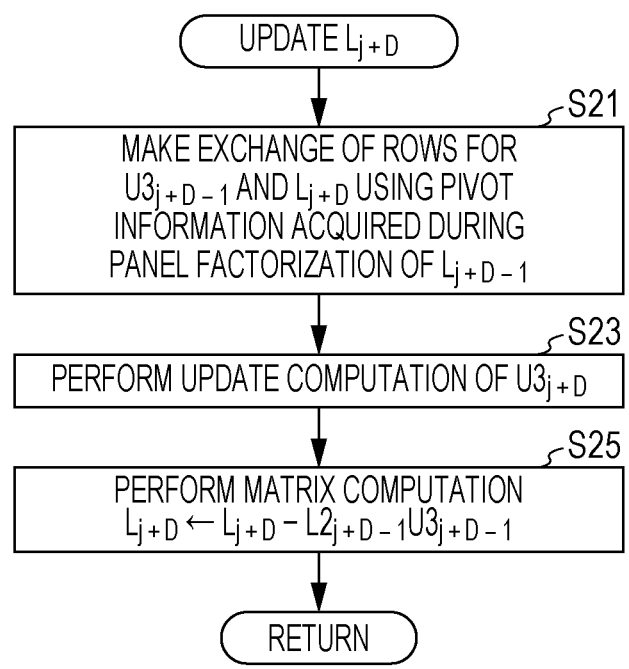
FIG. 22 is a flowchart illustrating panel update.
Figure 23:
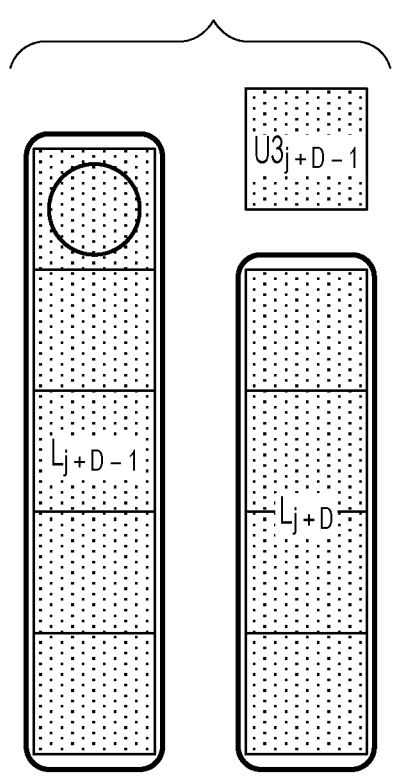
FIG. 23 is a diagram illustrating a positional relationship among panels.

The parallel computer system 1 makes an exchange of rows for $U3_{j+D-1}$ and $L_{j+D}$ using the pivot information acquired during panel factorization of $L_{j+D-1}$ (FIG. 22: step S21). FIG. 23 illustrates the positional relationship among $L_{j+D-1}$, $L_{j+D}$, and $U3_{j+D-1}$. As illustrated in FIG. 23, $U3_{j+D-1}$ is a block located above $L_{j+D}$. The exchange of rows has been described above.

The parallel computer system 1 performs update computation of $U3_{j+D}$ (step S23). The update computation has been described above.

The parallel computer system 1 performs the matrix computation $L_{j+D} \leftarrow L_{j+D} - L2_{j+D-1} U3_{j+D-1}$ (step S25), where the arrow is a symbol representing substitution. Then, the processing returns to that (FIG. 21) of the caller.

The parallel computer system 1 makes an exchange of rows for $U_j$ and $C_j$ using the pivot information acquired during panel factorization of $L_j$ (step S57).

The parallel computer system 1 performs update computation of $U_j$ (step S59).

Each of the nodes in the parallel computer system 1 exchanges $L_{j+D}$ and pivot information acquired during panel factorization of $L_{j+D}$ with another node (step S61). In addition, the parallel computer system 1 performs the matrix computation $C_j \leftarrow C_j - L_j U_j$ (step S63) in parallel with the process at step S61. The dashed lines in FIG. 21 indicate that the processes at steps S61 and S63 are executed in parallel.

Figure 24:
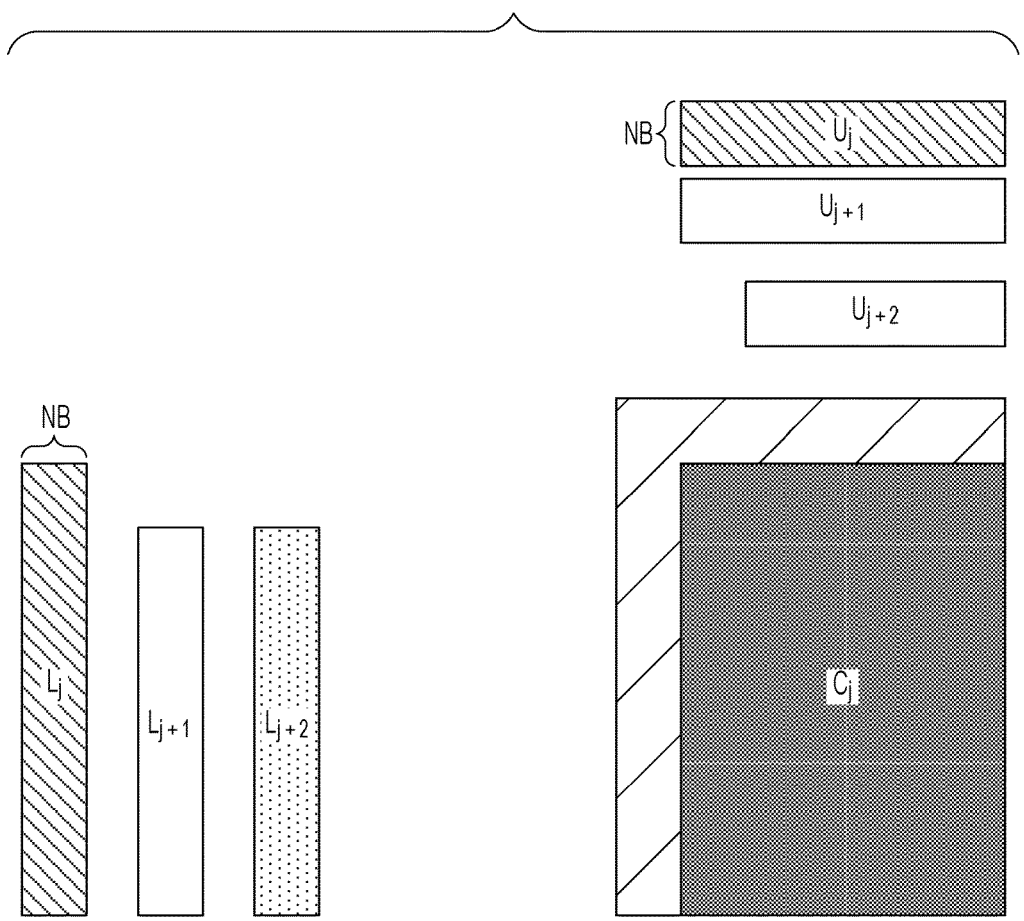
FIG. 24 is a diagram for explaining parallel execution.

FIG. 24 illustrates a specific example of the process at step S63. Assume here that the j-th block is being processed, and D=2. In this case, as illustrated in FIG. 24, the matrix computation $C_j \leftarrow C_j - L_j U_j$ is performed in parallel with communication with $L_{j+2}$.

The parallel computer system 1 increments the counter j by 1 (step S65), and determines whether or not j>(total number of blocks–D) is satisfied (step S67). If j>(total number of blocks–D) is not satisfied (step S67: No route), the processing returns to that of step S55 for the subsequent j. On the other hand, if j>(total number of blocks–D) is satisfied (step S67: Yes route), the parallel computer system 1 processes the remaining part of the matrix A (step S69), and then terminates the processing.

Furthermore, a specific example of the processing of the method of performing LU factorization with use of Look-ahead is described with reference to FIGS. 25 to 29. Here, the cases of j=1 to j=4 are described taking as an example the processing executed by the node (0, 0).

First, the node (0, 0) performs panel factorization of $L_j$ ((1) of FIG. 25) and transmits $L_j$ and pivot information acquired during panel factorization of $L_j$ to the node (0, 1) ((2) of FIG. 25). Assume that the node (0, 0) retains $L_j$.

Next, panel factorization of $L_2$ is performed ((3) of FIG. 25). The node (0, 0) does not perform the panel factorization of $L_2$ because the panel factorization of $L_2$ is performed only by the nodes (*, 1).

The node (0, 0) receives $L_2$ and pivot information acquired during panel factorization of $L_2$ from the node (0, 1) ((4) of FIG. 25).

The description moves on to FIG. 26. The node (0, 0) performs panel factorization of $L_3$ ((5) of FIG. 26), and makes an exchange of rows for $U2_1$ and $C_1$ using the pivot information acquired during panel factorization of $L_j$ ((6) of FIG. 26).

The node (0, 0) performs update computation of $U2_1$ ((7) of FIG. 26).

The node (0, 0) transmits $L_3$ and pivot information acquired during panel factorization of $L_3$ to the node (0, 1) while performing the matrix computation $C_1 \leftarrow C_1 - L2_1 U2_1$ ((8) of FIG. 26).

The description moves on to FIG. 27. Panel factorization of $L_4$ is performed ((9) of FIG. 27). The node (0, 0) does not perform the panel factorization of $L_4$ because the panel factorization of $L_4$ is performed only by the nodes (*, 1).

The node (0, 0) makes an exchange of rows for $U_2$ and $C_2$ using the pivot information acquired during panel factorization of $L_2$ ((10) of FIG. 27).

The node (0, 0) performs update computation of $U_2$ ((11) of FIG. 27).

The node (0, 0) receives $L_4$ and pivot information acquired during panel factorization of $L_4$ from the node (0, 1) while performing the matrix computation $C_2 \leftarrow C_2 - L_2 U_2$ ((12) of FIG. 27).

The description moves on to FIG. 28. The node (0, 0) performs panel factorization of $L_5$ ((13) of FIG. 28), and makes an exchange of rows for $U2_3$ and $C_3$ using the pivot information acquired during panel factorization of $L_3$ ((14) of FIG. 28).

The node (0, 0) performs update computation of $U2_3$ ((15) of FIG. 28).

The node (0, 0) transmits $L_5$ and pivot information acquired during panel factorization of $L_5$ to the node (0, 1) while performing the matrix computation $C_3 \leftarrow C_3 - L2_3 U2_3$ ((16) of FIG. 28).

The description moves on to FIG. 29. Panel factorization of $L_6$ is performed ((17) of FIG. 29). The node (0, 0) does not perform the panel factorization of $L_6$ because the panel factorization of $L_6$ is performed only by the nodes (*, 1).

The node (0, 0) makes an exchange of rows for $U2_4$ and $C_4$ using the pivot information acquired during panel factorization of $L_4$ ((18) of FIG. 29).

The node (0, 0) performs update computation of $U2_4$ ((19) of FIG. 29).

The node (0, 0) receives $L_6$ and pivot information acquired during panel factorization of $L_6$ from the node (0, 1) while performing the matrix computation $C_4 \leftarrow C_4 - L2_4 U2_4$ ((20) of FIG. 29).

Since the panel factorization and communication processing for the panel of $L_j$ are performed D times earlier than loop iteration, $L_{j+D}$ to be exchanged between nodes and $L_j$ to be used in matrix computation are different from each other, and thus no dependence relationship exists between $L_{j+D}$ and $L_j$. Accordingly, it becomes possible to perform communication and matrix computation in parallel. For example, it becomes possible to perform matrix computation while waiting for a start of communication.

Of the processes executed in LU factorization, the computation of matrix products takes time due to the largest amount of computation. Thus, it is possible to greatly reduce the processing time if the computation of matrix products is performed at high speed. The computation of matrix products is performed at the same width as the block size NB. In general, the computational efficiency increases as the matrix size increases. Hence, it is preferable that NB be increased as much as possible if only the computation of matrix products is considered.

In order to improve load balancing, however, it is preferable to make NB as small as possible. The sizes of the matrices to be processed by the nodes become smaller by NB as LU factorization proceeds. Note that the sizes of the matrices do not become smaller simultaneously at all the nodes; the size of the matrix becomes smaller only in the node concerning the computation at that point. Hence, the difference between the sizes of two matrices retained by any two of the nodes may be NB. This difference leads to the difference in the amount of computation of matrix products. In the case of inappropriate load balancing, a node with a smaller amount of computation has to wait until a node with a larger amount of computation completes computation, and thus the overall processing time becomes long.

Figure 30:
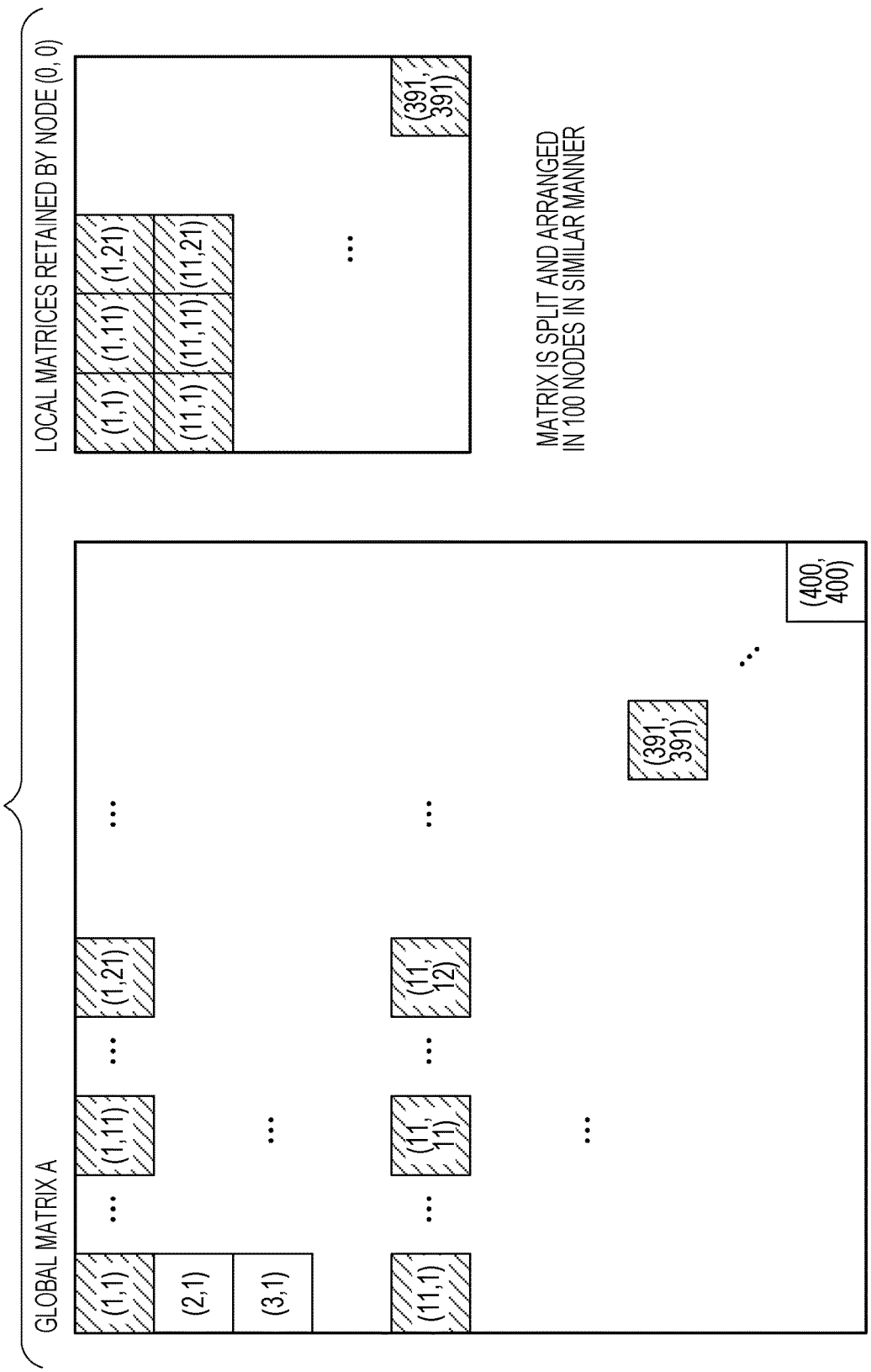
FIG. 30 is a diagram for explaining a difference in an amount of computation.

The above problem is discussed with reference to FIGS. 30 to 31. The global matrix A in FIG. 30 is a 400000×400000 square matrix with NB=1000, and the blocks are distributed to 10×10=100 nodes. Hence, 40000×40000 local matrices are allocated to one node. The blocks with diagonal lines in the global matrix A are allocated to the node (0, 0).

Figure 31:
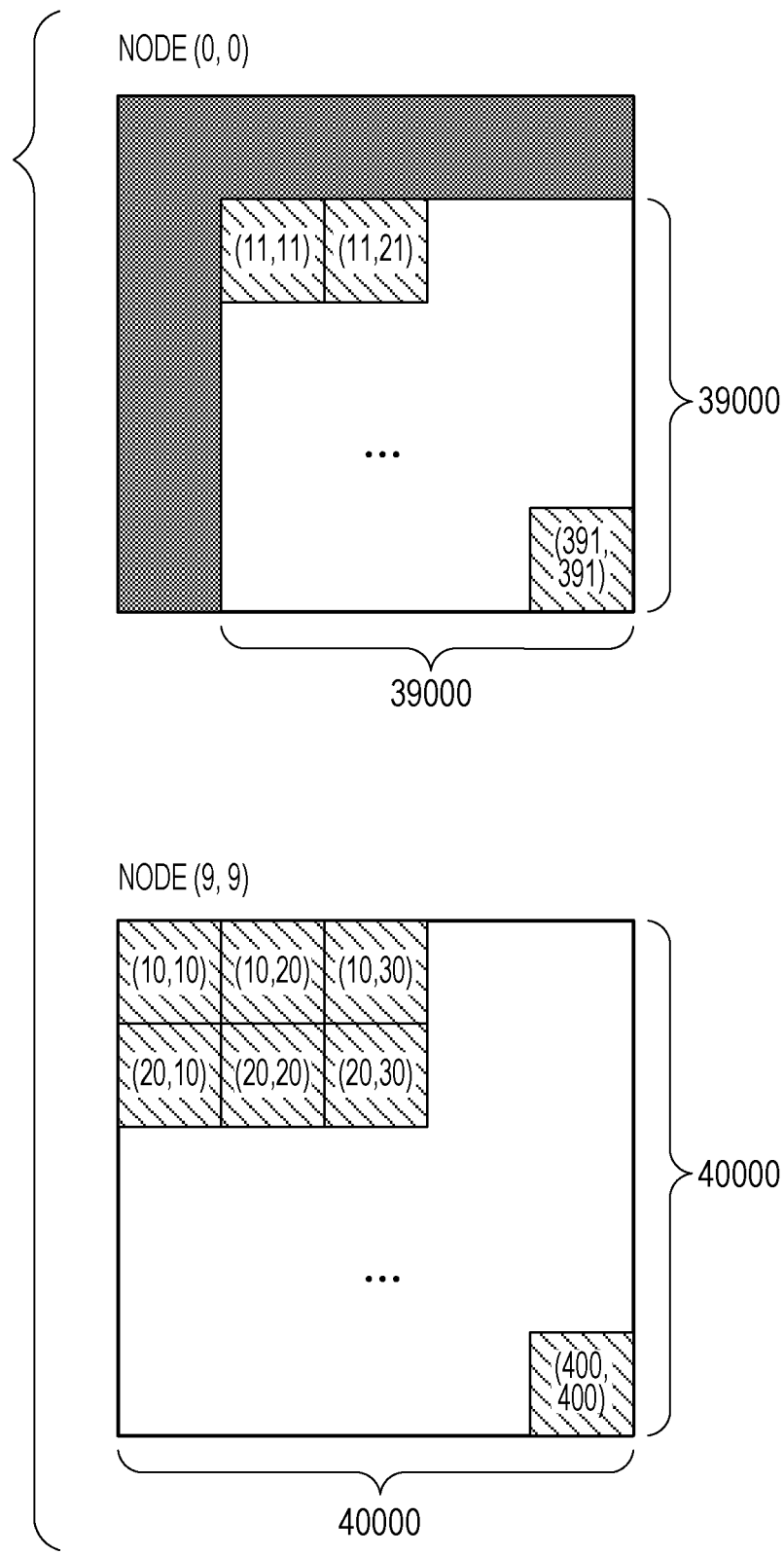
FIG. 31 is a diagram for explaining the difference in the amount of computation.

As illustrated in FIG. 31, when the node (0, 0) completes the process for one block, the node (0, 0) then computes the matrix product of (39000, 1000) and (1000, 39000). The amount of computation (the number of additions and multiplications) at this time is 3.04E+12 (times). At this time, the node (9, 9) computes the matrix product of (40000, 1000) and (1000, 40000). The amount of computation at this time is 3.20E+12 (times). Hence, the amount of computation by the node (9, 9) is approximately 5% more than that by the node (0, 0). Here assume that the block size NB is 500. Then, the node (0, 0) computes the matrix product of (39500, 500) and (500, 39500). The amount of computation at this time is 1.56E+12 (times). At this time, the node (9, 9) computes the matrix product of (40000, 500) and (500, 40000). The amount of computation at this time is 1.60E+12 (times). Hence, the amount of computation by the node (9, 9) is approximately 2.5% more than that by the node (0, 0).

In order to enable computation of matrix products at a larger width while using a relatively small NB with a good load balancing, consider integrating computation procedures of matrix products to perform computation of a plurality of matrix products at a larger width (for example, integrate (8) of FIG. 26 and (12) of FIG. 27). However, this method has the following problems.

The first problem is the processing order. When integrating the matrix product in (8) of FIG. 26 and the matrix product in (12) of FIG. 27, the process of (8) of FIG. 26 is executed while the process of (12) of FIG. 27 is being executed. However, in the process of (10) of FIG. 27, since an exchange of rows is made for the region $C_1$ to update the region, the positions of the rows of $C_2$ do not correspond to the positions of the rows of $L_j$ after the process of (10) of FIG. 27 is executed. Hence, the processing of (8) of FIG. 26 is not allowed after the processing of (10) of FIG. 27, and thus it is not possible to integrate the matrix product in (8) of FIG. 26 and the matrix product in (12) of FIG. 27.

The second problem is the size of the matrices. The size of $L_{j+1}$ may become smaller than that of $L_j$ by one block as the processing of the blocks proceeds. In this case, it is not possible to concatenate $L_{j+1}$ and $L_j$ as they are. This is true for the cases of (16) of FIG. 28 and (20) of FIG. 29 in the specific example described above. $L_3$ has a size of three blocks in (16) of FIG. 28, while $L2_4$ has a size of two blocks in (20) of FIG. 29. As described above, since it is not possible to concatenate matrices with different sizes, it is not possible to complete the processing by performing one computation procedure of matrix product.

The third problem is the communication with use of Look-ahead. When Look-ahead is used, as illustrated in (8) of FIG. 26 and (12) of FIG. 27, one communication procedure is performed for each computation procedure of matrix product. Consider the case in which computation procedures of matrix products are integrated to perform computation of matrix products at once. Although one communication procedure may be performed in parallel with the computation procedures of the matrix products, it is not possible to perform the remaining communication procedure in parallel with the computation procedures of the matrix products. Hence, the processing time increases.

In the following, a method of performing LU factorization is described which maintains both computational capability of matrix products and load balancing.

[LU Factorization of the Embodiment]

The overview of the parallel computer system 1, the hardware configuration of a node, and the functional blocks of a node in this embodiment have been described with reference to FIGS. 7 to 9.

LU factorization of the embodiment is described with reference to FIGS. 32 to 43.

Figure 32:
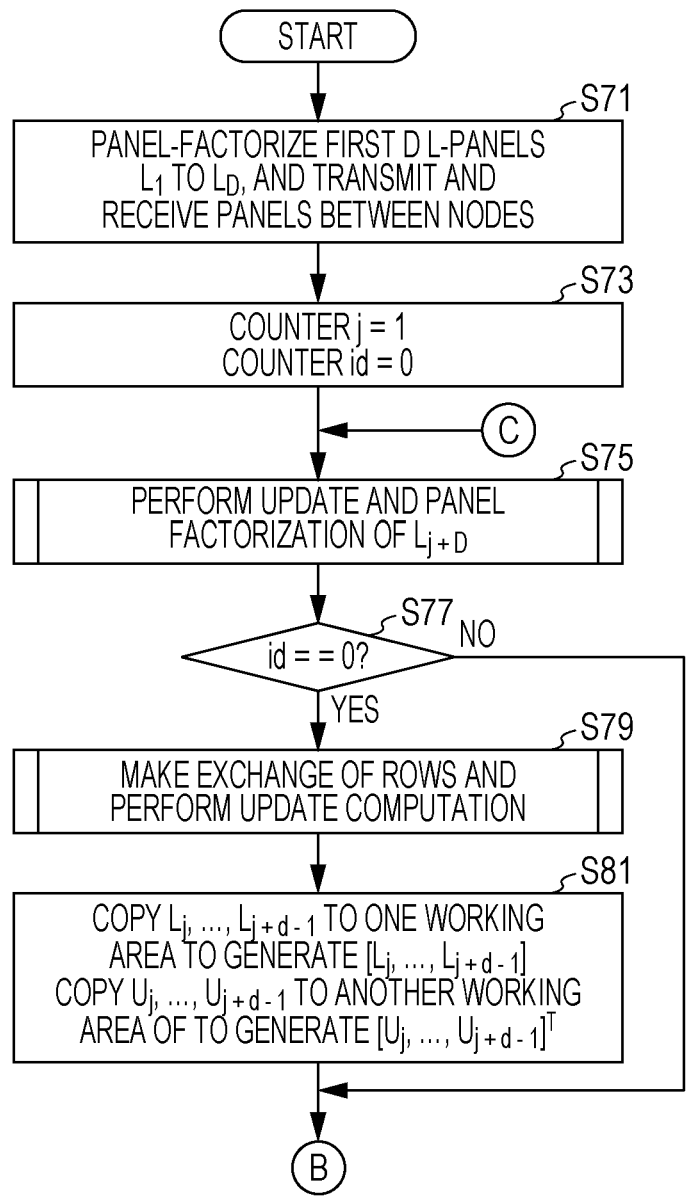
FIG. 32 is a flowchart illustrating LU factorization in the embodiment.
Figure 33:
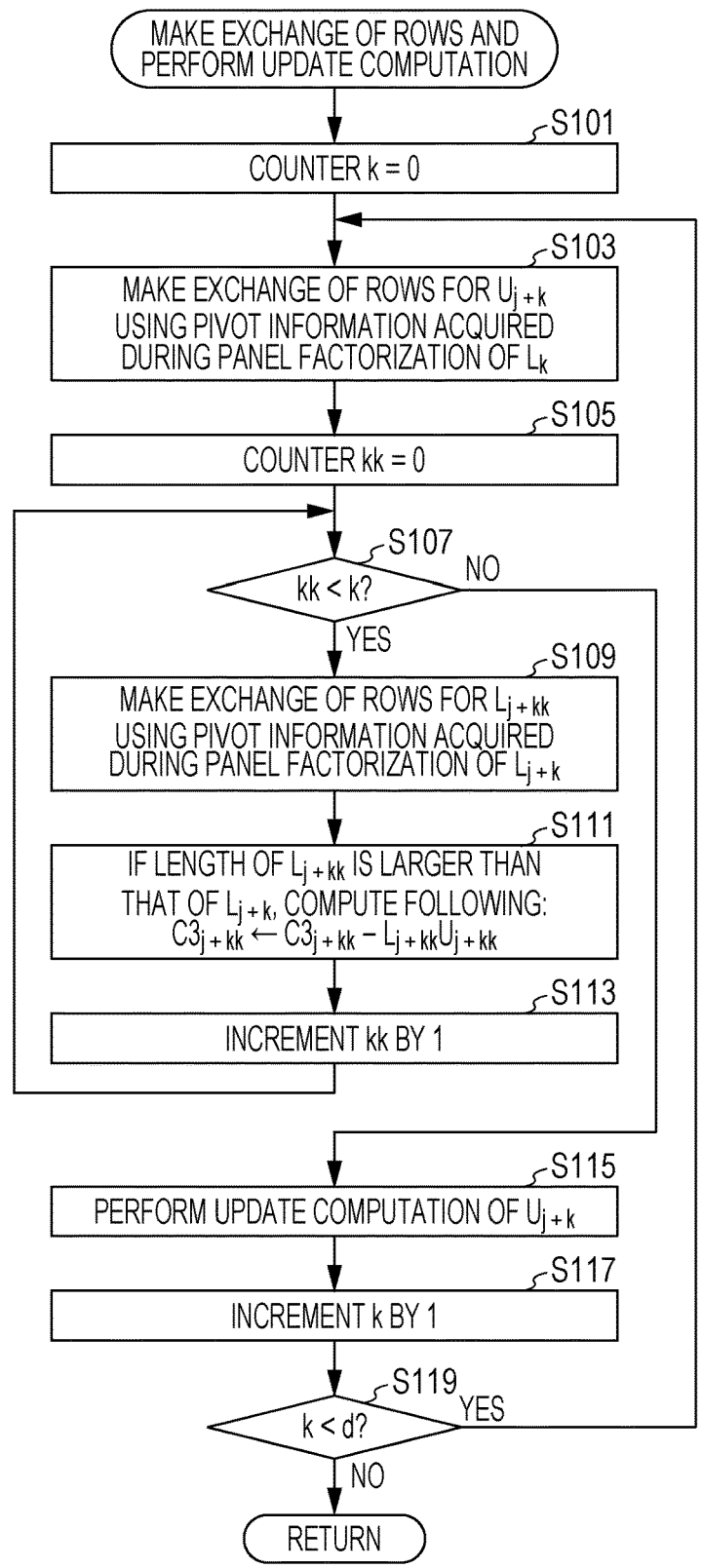
FIG. 33 is a flowchart illustrating exchange of rows and update computation.

First, the parallel computer system 1 panel-factorizes the first D L-panels $L_1$ to $L_D$ (where D is the depth of Look-ahead), and transmits and receives panels between nodes (FIG. 32: step S71).

The parallel computer system 1 sets a counter j for counting the number of blocks and a counter id for counting the number of processes such that j=1 and id=0 (step S73).

The parallel computer system 1 performs update and panel factorization of $L_{j+D}$ (step S75). This process is the same as those at steps S3 and S55.

The parallel computer system 1 determines whether or not id==0 is satisfied (step S77), where "==" is the equality operator. If id==0 is not satisfied (step S77: No route), the processing proceeds via the terminal B to step S83 of FIG. 34. On the other hand, if id==0 is satisfied (step S77: Yes route), the parallel computer system 1 makes an exchange of rows and performs update computation (step S79). The exchange of rows and the update computation at step S79 is described with reference to FIG. 33.

First, the parallel computer system 1 sets a counter k such that k=0 (FIG. 33: step S101), and makes an exchange of rows for $U_{j+k}$ using the pivot information acquired during panel factorization of $L_k$ (step S103).

The parallel computer system 1 sets a counter kk such that kk=0 (step S105), and determines whether or not kk<k is satisfied (step S107). If kk<k is satisfied (step S107: Yes route), the parallel computer system 1 makes an exchange of rows for $L_{j+kk}$ using the pivot information acquired during panel factorization of $L_{j+k}$ (step S109).

The parallel computer system 1 performs the matrix computation $C3_{j+kk} \leftarrow C3_{j+kk} - L_{j+kk}U_{j+kk}$ (step S111) if the length of $L_{j+kk}$ in the column direction is longer than that of $L_{j+k}$ in the column direction.

The parallel computer system 1 increments the counter kk by 1 (step S113), and returns to the process at step S107.

On the other hand, if kk<k is not satisfied (step S107: No route), the parallel computer system 1 performs update computation of $U_{j+k}$ (step S115), and increments k by 1 (step S117).

The parallel computer system 1 determines whether or not k<d is satisfied (step S119), where d represents the number of matrices to be integrated. If k<d is satisfied (step S119: Yes route), the processing returns to step S103. If k<d is not satisfied (step S119: No route), the processing returns to that of the caller.

The description goes back to FIG. 32. The parallel computer system 1 copies $L_j, \ldots, L_{j+d-1}$ to one working area of the data storage unit 112 to generate $[L_j, \ldots, L_{j+d-1}]$, and copies $U_j, \ldots, U_{j+d-1}$ to another working area of the data storage unit 112 to generate $[U_j, \ldots, U_{j+d-1}]^T$ (step S81). The processing proceeds via the terminal B to step S83 of FIG. 34.

Figure 34:
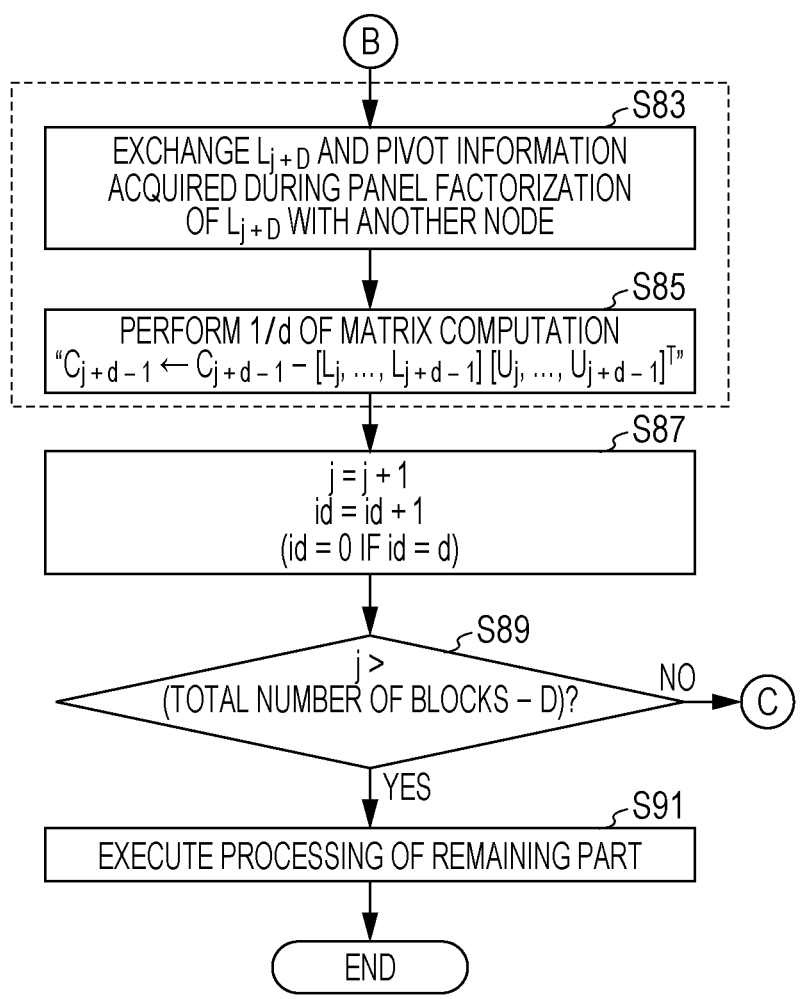
FIG. 34 is a flowchart illustrating the LU factorization in the embodiment.

The description moves on to FIG. 34. Each of the nodes in the parallel computer system 1 exchanges $L_{j+D}$ and pivot information acquired during panel factorization of $L_{j+D}$ with another node (step S83).

The parallel computer system 1 performs 1/d of the matrix computation "$C_{j+d-1} \leftarrow C_{j+d-1} - [L_j, \ldots, L_{j+d-1}] [U_j, \ldots, U_{j+d-1}]^T$" (step S85). The dashed lines in FIG. 34 indicate that the processes at steps S83 and S85 are executed in parallel. At step S85, the parallel computer system 1 compares the length of the L-panel with that of the U-panel, and then performs matrix computation to split the longer panel into d pieces, thereby reducing the risk of a decrease in computational efficiency. Here, L2 and U2 are sometimes used respectively for the L-panel and the U-panel to equalize the lengths or to remove the blocks corresponding to the diagonal parts of the matrix A.

Figure 35:
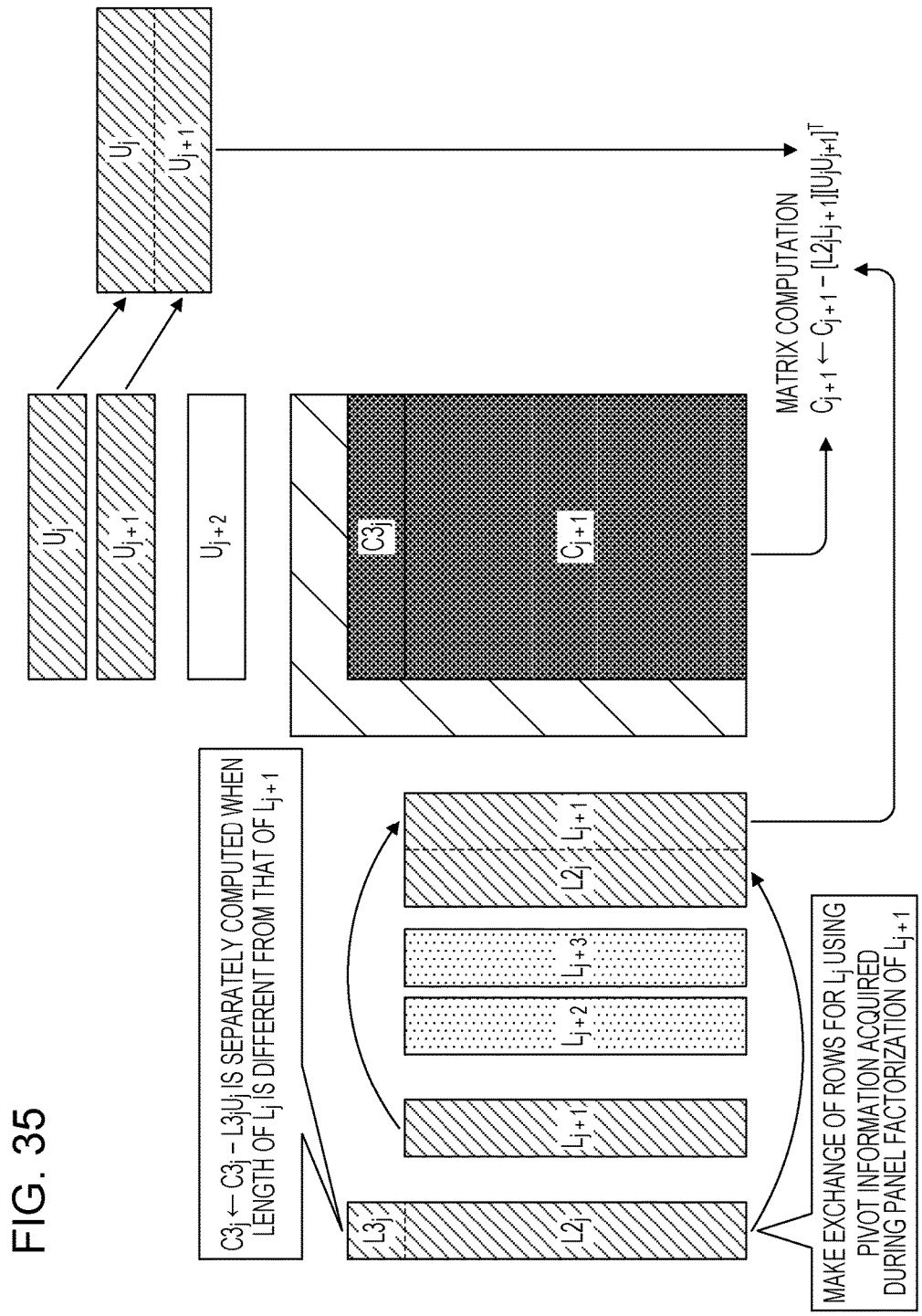
FIG. 35 is a diagram for explaining integration of matrices.
Figure 36:
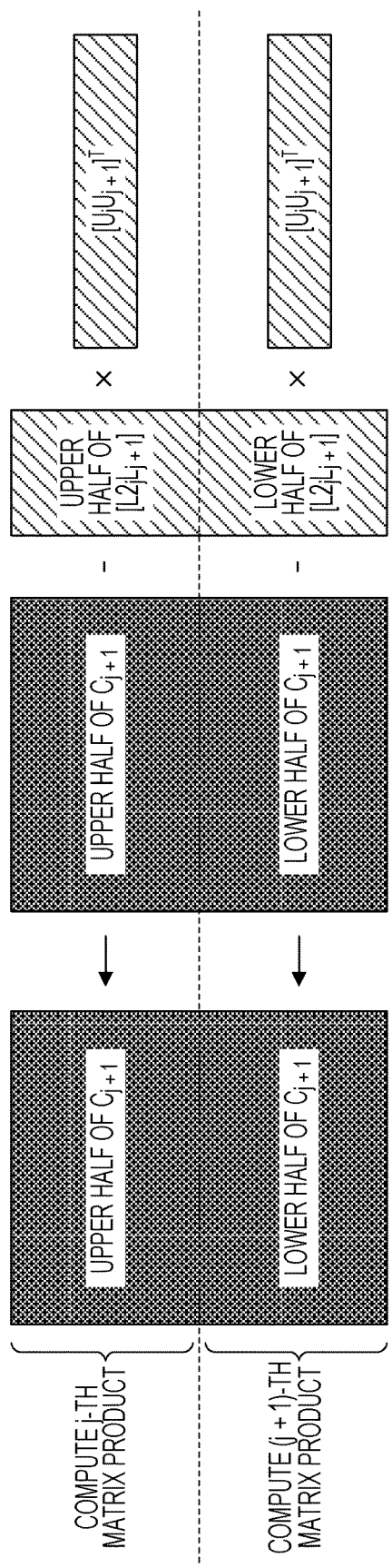
FIG. 36 is a diagram for explaining re-factorization of a matrix.

FIG. 35 illustrates a specific example of the process at step S85. FIG. 35 illustrates a submatrix which is used when processing the j-th block. Assume that d=2. In this case, the parallel computer system 1 makes an exchange of rows for $L_j$ using the pivot information acquired during panel factorization of $L_{j+1}$. When the length of $L_j$ is different from that of $L_{j+1}$, the matrix computation $C3_j \leftarrow C3_j - L3_j U_j$ is separately performed since $L3_j$ exists. Then, $L2_j$ and $L_{j+1}$ are integrated in the row direction while $U_j$ and $U_{j+1}$ are integrated in the column direction, thereby matrix computation is performed. Note that if d=2, one procedure of step S85 processes ½ of that matrix computation, as illustrated in FIG. 36. Matrix computation is first performed for the upper half, and then for the remaining lower half.

The parallel computer system 1 sets j such that j=j+1 and id=id+1 (step S87). Note that if id=d, the parallel computer system 1 sets id such that id=0.

The parallel computer system 1 determines whether or not j>(total number of blocks−D) is satisfied (step S89). The total number of blocks is the number of blocks both in the row direction and in the column direction. If j>(total number of blocks−D) is not satisfied (step S89: No route), the processing returns via the terminal C to step S75 of FIG. 32. On the other hand, if j>(total number of blocks−D) is satisfied (step S89: Yes route), the parallel computer system 1 processes the remaining part (step S91), and then terminates the processing.

Furthermore, a specific example of the processing of performing LU factorization in the embodiment is described with reference to FIGS. 37 to 43. Here, the cases of j=1 to j=4 are described taking as an example the processing executed by the node (0, 0).

First, the node (0, 0) performs panel factorization of $L_j$ ((1) of FIG. 37), and transmits $L_1$ and pivot information acquired during panel factorization of $L_1$ to the node (0, 1) ((2) of FIG. 37). Assume that the node (0, 0) retains $L_1$.

Next, panel factorization of $L_2$ is performed ((3) of FIG. 37). The node (0, 0) does not perform the panel factorization of $L_2$ because the panel factorization of $L_2$ is performed only by the nodes (*, 1).

The node (0, 0) receives $L_2$ and pivot information acquired during panel factorization of $L_2$ from the node (0, 1) ((4) of FIG. 37).

The description moves on to FIG. 38. The node (0, 0) performs panel factorization of $L_3$ ((5) of FIG. 38), and makes an exchange of rows for $U2_1$ and $C_1$ using the pivot information acquired during panel factorization of $L_1$ ((6) of FIG. 38).

The node (0, 0) performs update computation of $U2_1$ ((7) of FIG. 38).

The node (0, 0) makes an exchange of rows for $U_2$ and $C_2$ using pivot information acquired during panel factorization of $L_2$ ((8) of FIG. 38).

The description moves on to FIG. 39. The node (0, 0) makes an exchange of rows for $L2_1$ using pivot information acquired during panel factorization of $L_2$ ((9) of FIG. 39).

The node (0, 0) computes the head row block of $C_1$ (assumed to be $C3_1$ here) using $C3_1 \leftarrow C3_1 - L3_1 U_1$ if $L2_1$ is longer than $L_2$ ((10) of FIG. 39). Since the length of $L2_1$ is equal to that of $L_2$ in this case, the processing is omitted.

The node (0, 0) performs update computation of $U_2$ ((11) of FIG. 39).

The node (0, 0) copies each of the L-panels and the U-panels to one working area to integrate the matrices ((12) of FIG. 39).

The description moves on to FIG. 40. The node (0, 0) transmits $L_3$ and pivot information acquired during panel factorization of $L_3$ to the node (0, 1) while performing matrix computation of the upper half of $C_2 \leftarrow C_2 - [L2_1 L_2][U2_1 U_2]^T$ ((13) of FIG. 40).

Next, panel factorization of $L_4$ is performed ((14) of FIG. 40). The node (0, 0) does not perform the panel factorization of $L_4$ because the panel factorization of $L_4$ is performed only by the nodes (*, 1).

The node (0, 0) receives $L_4$ and pivot information acquired during panel factorization of $L_4$ from the node (0, 1) while performing matrix computation of the lower half of $C_2 \leftarrow C_2 - [L2_1 L_2][U2_1 U_2]^T$ ((15) of FIG. 40).

The description moves on to FIG. 41. The node (0, 0) performs panel factorization of $L_5$ ((16) of FIG. 41), and makes an exchange of rows for $U2_3$ and $C_3$ using the pivot information acquired during panel factorization of $L_3$ ((17) of FIG. 41).

The node (0, 0) performs update computation of $U2_3$ ((18) of FIG. 41).

The node (0, 0) makes an exchange of rows for $U2_4$ and $C_4$ using pivot information acquired during panel factorization of $L_4$ ((19) of FIG. 41).

The description moves on to FIG. 42. The node (0, 0) makes an exchange of rows for $L_3$ using the pivot information acquired during panel factorization of $L_4$ ((20) of FIG. 42).

The node (0, 0) computes the head row block of $C_3$ (assumed to be $C3_3$ here) using $C3_3 \leftarrow C3_3 - L3_3 U2_3$ if $L_3$ is longer than $L2_4$ ((21) of FIG. 42). Since the length of $L_3$ is longer than that of $L2_4$ in this case, the node (0, 0) computes $C3_3 \leftarrow C3_3 - L3_3 U2_3$.

The node (0, 0) performs update computation of $U2_4$ ((22) of FIG. 42).

The node (0, 0) copies each of the L-panels and the U-panels to one working area to integrate the matrices ((23) of FIG. 42).

The description moves on to FIG. 43. The node (0, 0) transmits $L_5$ and pivot information acquired during panel factorization of $L_5$ to the node (0, 1) while performing matrix computation of the upper half of $C_4 \leftarrow C_4 - [L2_3 L2_4][U2_3 U2_4]^T$ ((24) of FIG. 43).

Next, panel factorization of $L_6$ is performed ((25) of FIG. 43). The node (0, 0) does not perform the panel factorization of $L_6$ because the panel factorization of $L_6$ is performed only by the nodes (*, 1).

The node (0, 0) receives $L_6$ and pivot information acquired during panel factorization of $L_6$ from the node (0, 1) while performing matrix computation of the lower half of $C_4 \leftarrow C_4 - [L2_3 L2_4][U2_3 U2_4]^T$ ((26) of FIG. 43).

It is possible to deal with the first to third problems by executing the processing described above. With regard to the first problem, the exchange of rows made at (10) of FIG. 27 is also made for $L2_1$ in order to be able to execute the process at (8) of FIG. 26 after the process at (10) of FIG. 27 ((9) of FIG. 39). This allows the rows of $L2_1$ and those of $C_2$ to correspond to one another, and hence, makes it possible to execute processing corresponding to that of $C_2 \leftarrow C_2 - L2_1 U2_1$ after the processing corresponding to that at (10) of FIG. 27.

The second problem is dealt with by the processes at (10) of FIG. 39 and (21) of FIG. 42. These processes make it possible to equalize the length of $L2_3$ with that of $L2_4$ by separately performing matrix computations when the lengths of the L-panels are different.

The third problem is dealt with by splitting again an integrated matrix into d pieces. This makes is possible to perform matrix computation and communication in parallel based on the integrated matrices thus split, and thus to conceal communication time, thereby reducing processing time.

As described above, the processing according to the embodiment makes it possible to reduce the time taken to solve a set of simultaneous linear equations by the parallel computer system 1.

One embodiment of the present disclosure has been described so far, but the present disclosure is not limited to the above-described embodiment. For example, the functional block configuration of the nodes described above may differ from the actual program module configuration. In addition, the order of the processes in the flowcharts may be changed as long as the processing results do not change. Moreover, these processes may be executed in parallel.

Note that D satisfies D≥d, but preferably satisfies D=d because D greater than d may not improve the computational performance in some cases.

APPENDIX

This appendix provides additional explanation on LU factorization with use of HPL.

Figure 44:
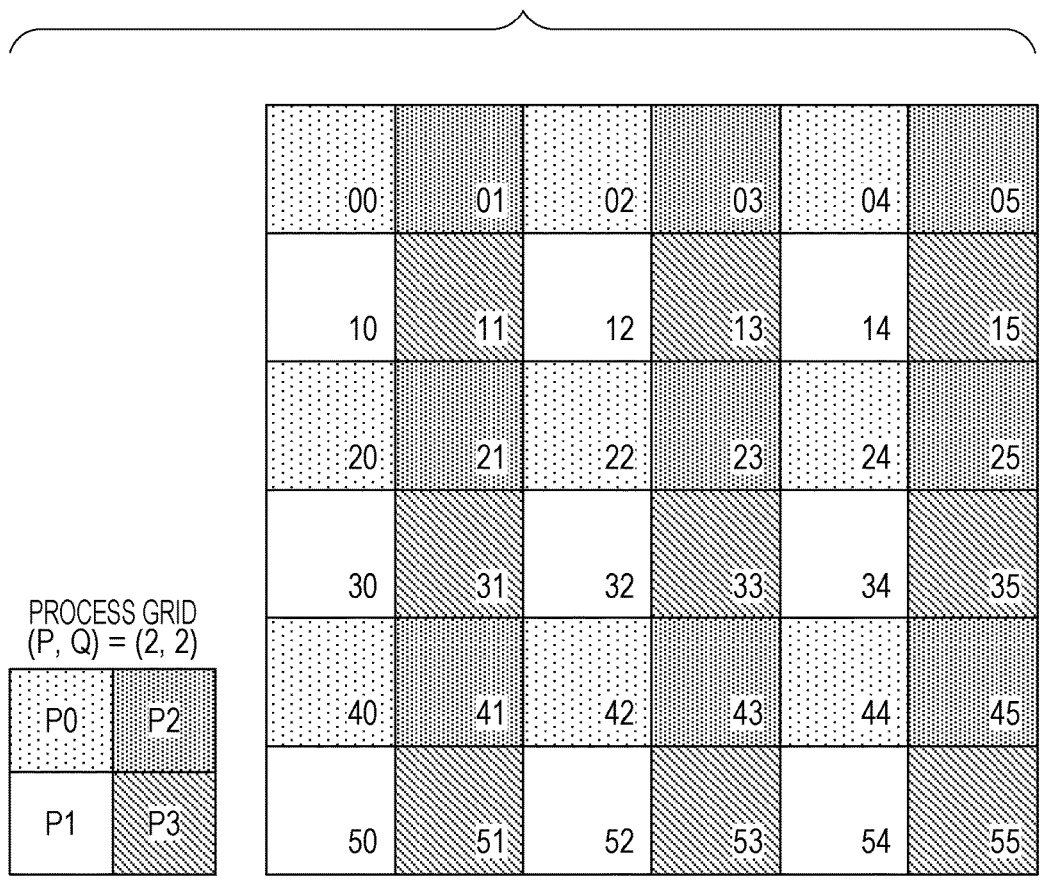
FIG. 44 is a diagram for explaining LU factorization by HPL.
Figure 45:
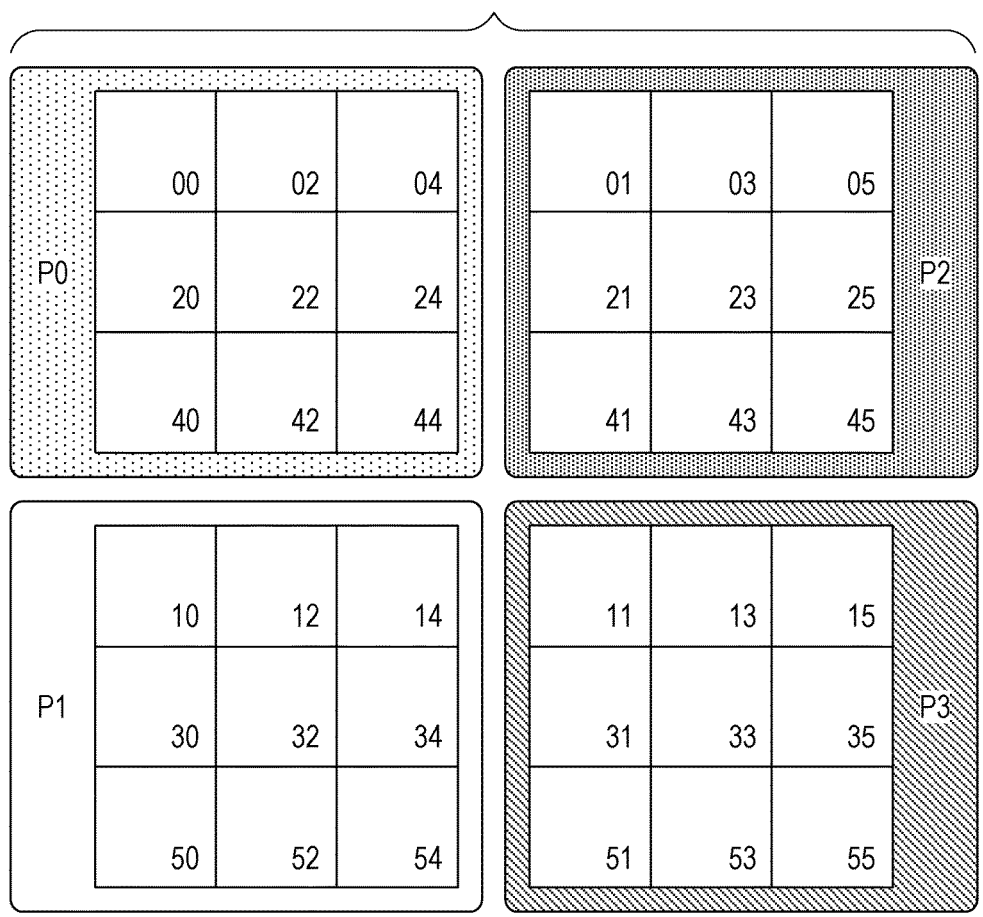
FIG. 45 is a diagram for explaining the LU factorization by the HPL.

Here, as illustrated in FIG. 44, a case is considered in which the global matrix A is allocated to four processes P0 to P3. A process grid (P, Q) is (2, 2). FIG. 45 illustrates the blocks allocated to the processes. Each of the processes is assigned the same number (=9) of blocks.

Figure 46:
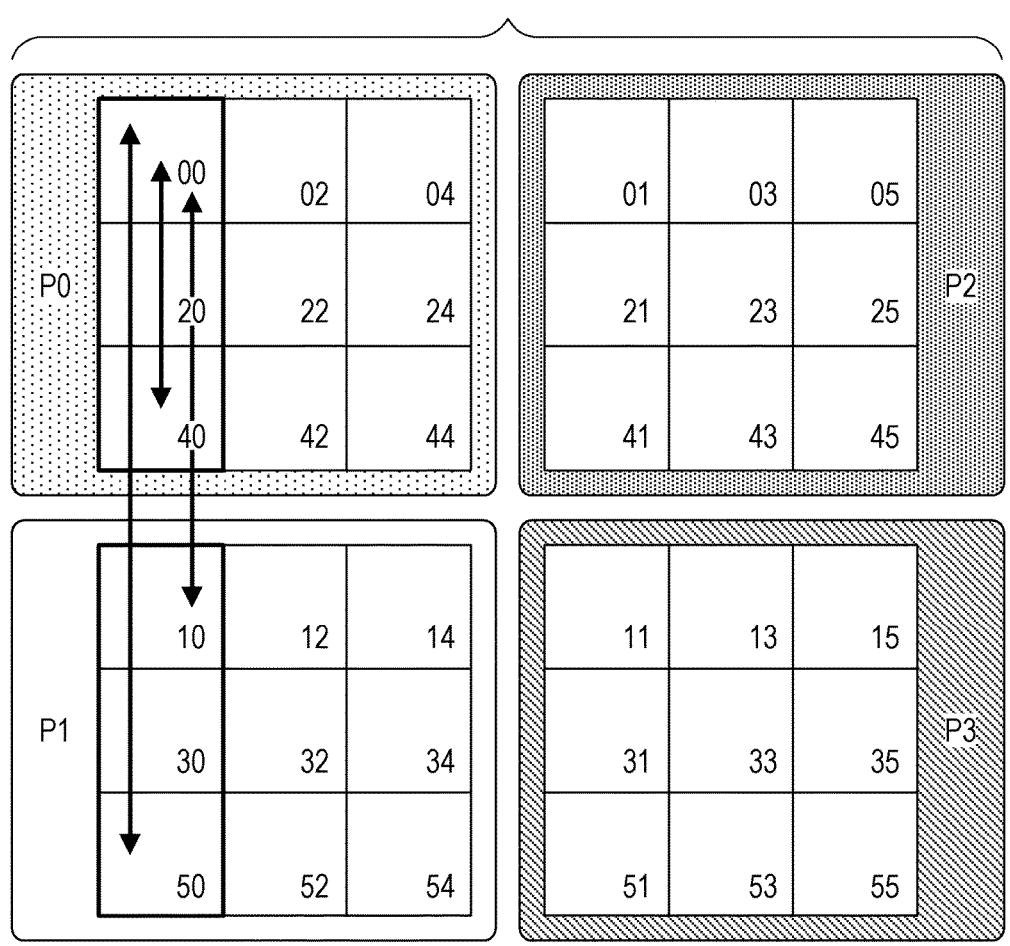
FIG. 46 is a diagram for explaining the LU factorization by the HPL.

FIG. 46 illustrates an example of communication performed during panel factorization. In the panel factorization, communication in the column direction (vertical direction) is performed between processes including blocks each of which has a number with zero in its ones place. Pivot information is stored during the panel factorization.

Figure 47:
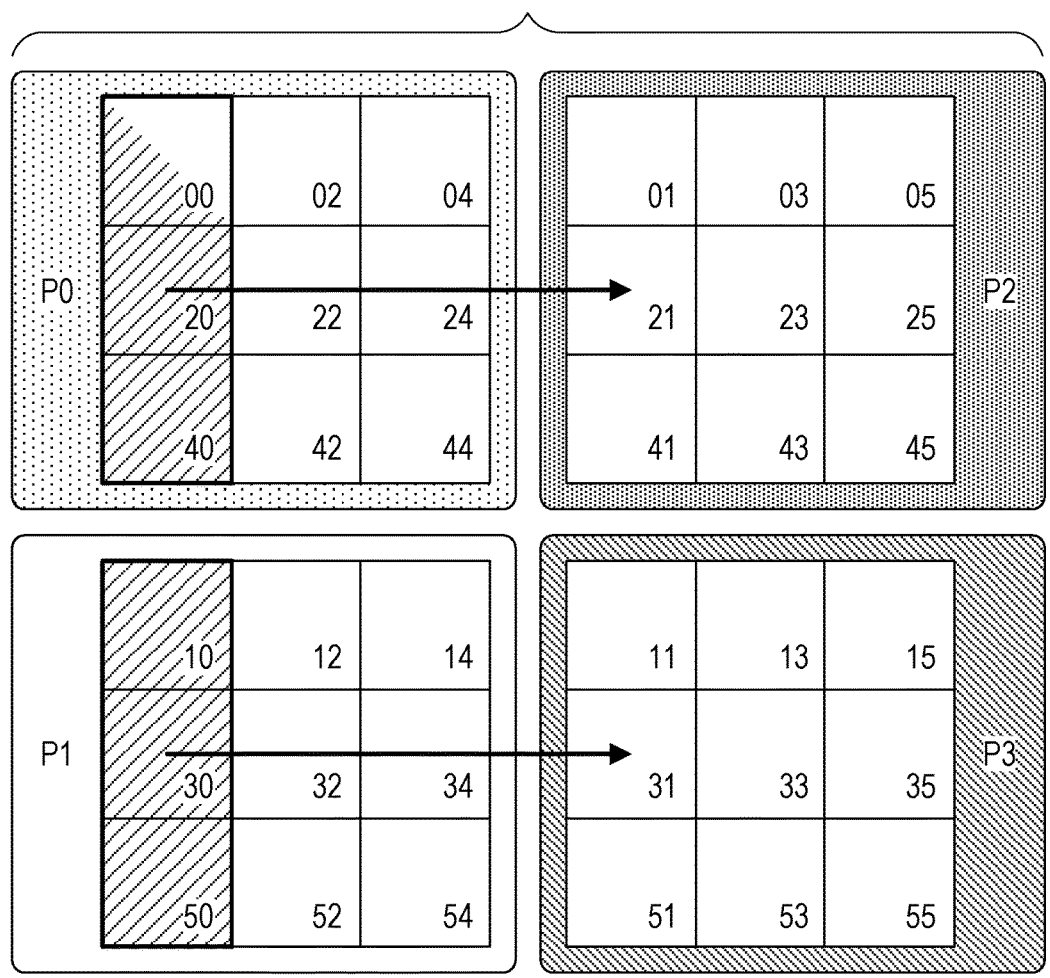
FIG. 47 is a diagram for explaining the LU factorization by the HPL.

FIG. 47 illustrates an example of a broadcast of a column panel. During the broadcast of a column panel, communication in the row direction (horizontal direction) is performed between row processes.

Figure 48:
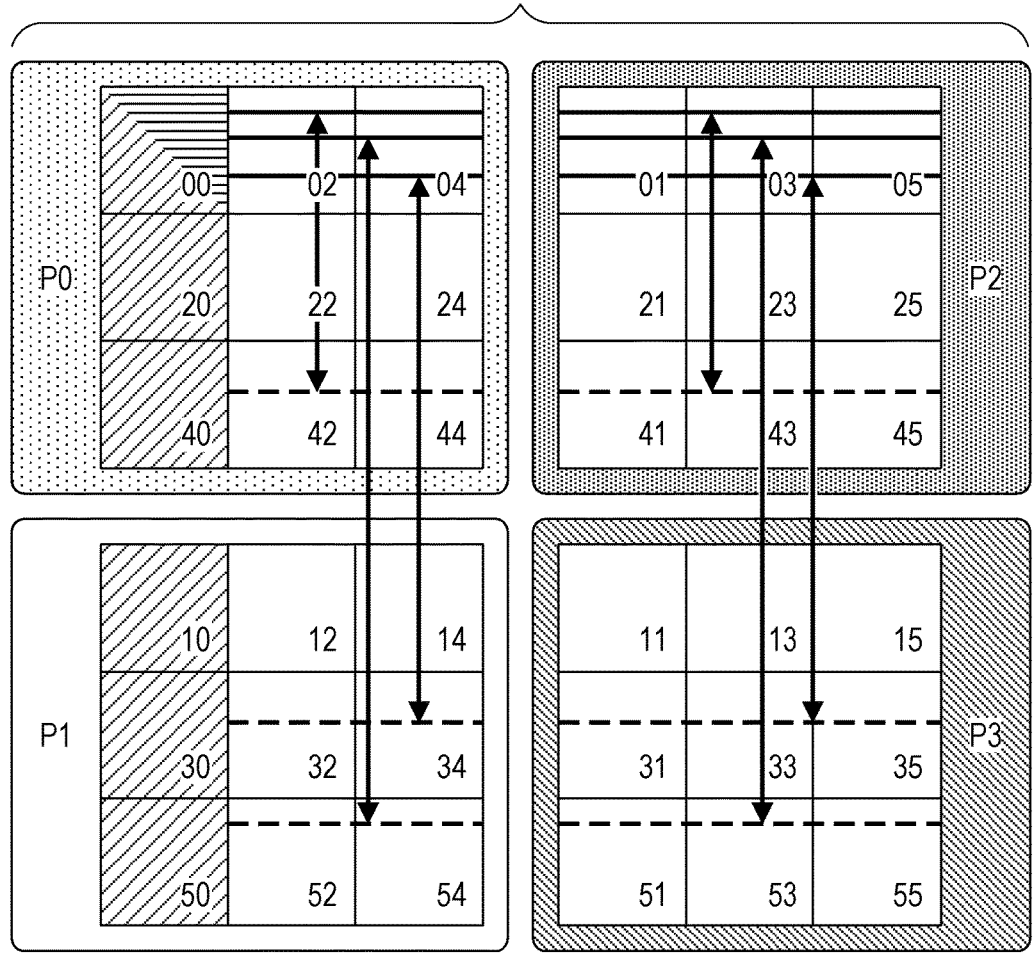
FIG. 48 is a diagram for explaining the LU factorization by the HPL.

FIG. 48 illustrates an example of communication during an exchange of rows. During the exchange of rows, communication in the column direction is performed between column processes. The exchange of rows is made based on the stored pivot information.

Figure 49:
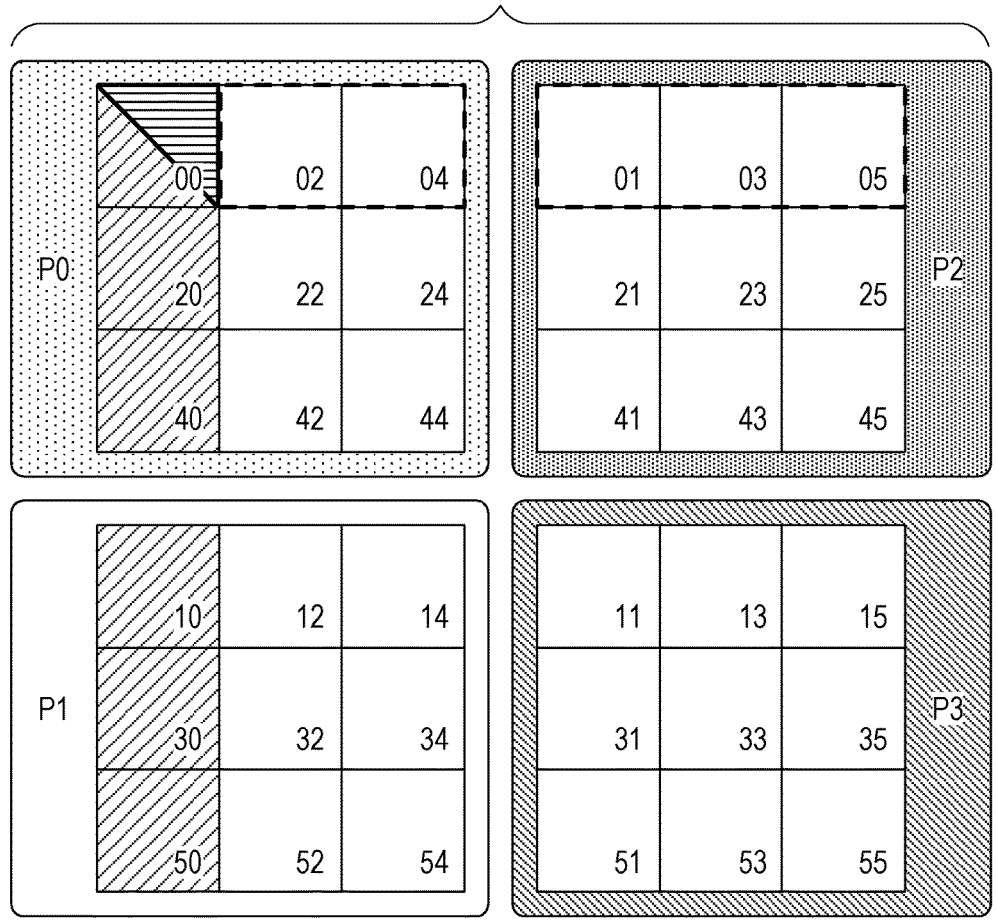
FIG. 49 is a diagram for explaining the LU factorization by the HPL.

FIG. 49 illustrates an example of blocks to be subjected to update computation. The update computation is performed for the processes including row blocks each of which has a number with zero in its tens place. In other words, the processes P0 and P2 perform update computation.

Figure 50:
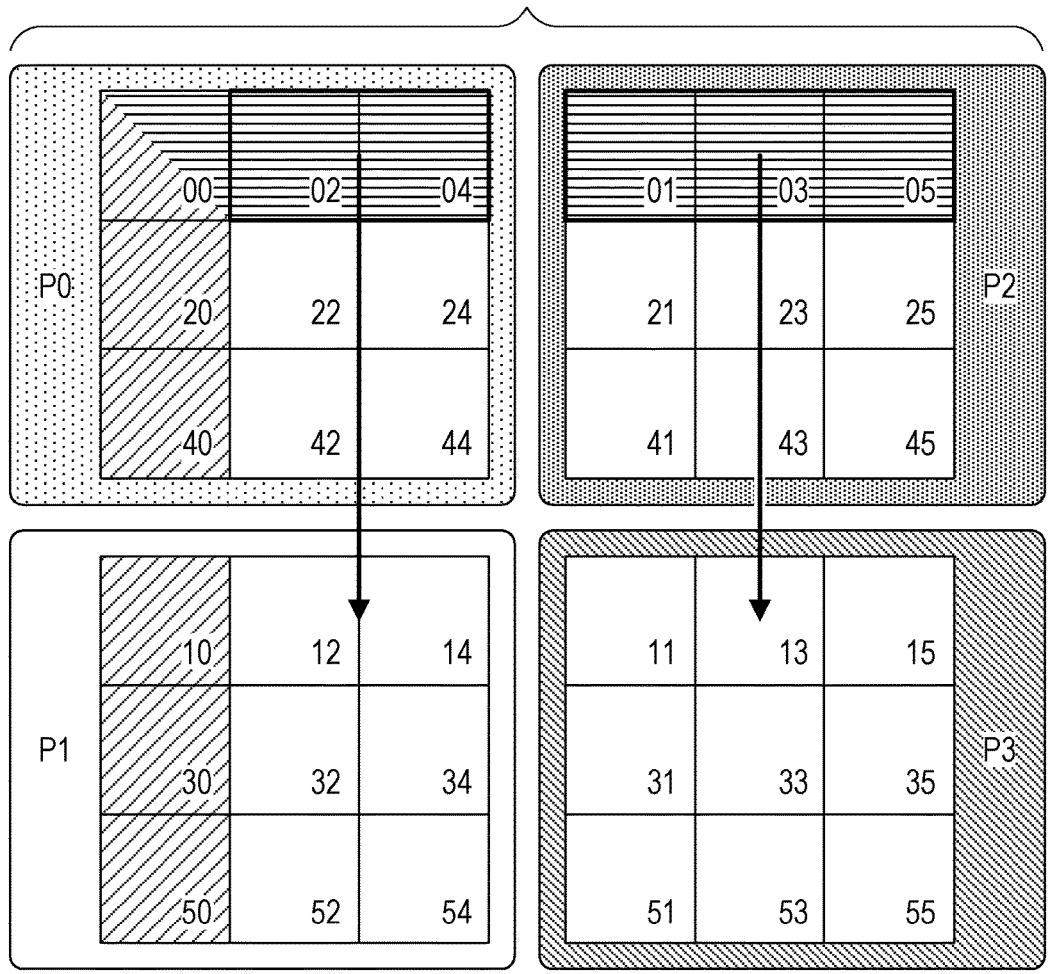
FIG. 50 is a diagram for explaining the LU factorization by the HPL.

FIG. 50 illustrates an example of a broadcast of a row panel. During the broadcast of a row panel, communication in the column direction is performed between column processes.

Figure 51:
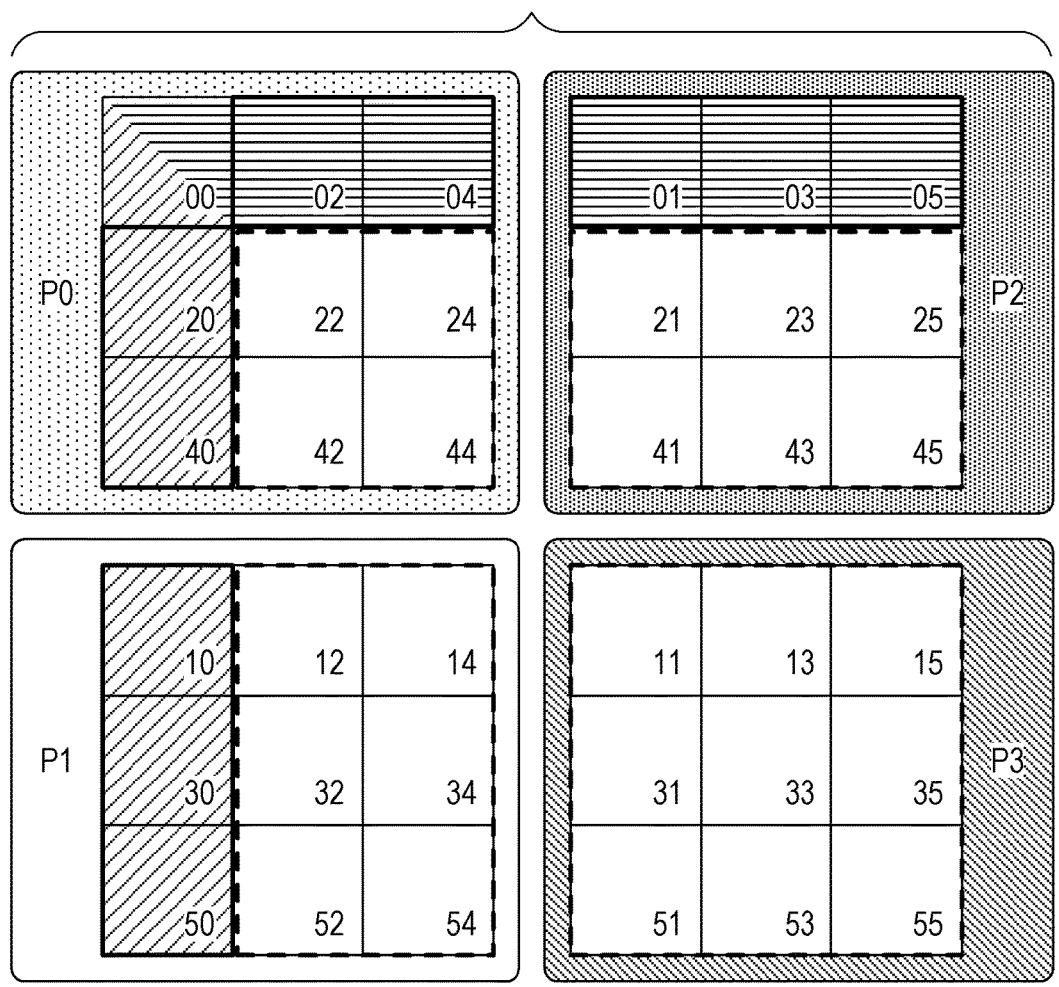
FIG. 51 is a diagram for explaining the LU factorization by the HPL.

FIG. 51 illustrates an example of performing update computation of a remainder matrix. In this example, the update computation is performed using a matrix containing a set of blocks 20, 40, 10, 30, and 50 and a matrix containing a set of blocks 02, 04, 01, 03, and 05. The appendix ends here.

The embodiment of the present disclosure described above is summarized as follows.

A parallel computation method according to the embodiment causes each of the processors configured to perform LU factorization in parallel to execute processing including: (A) generating a first panel by integrating row panels among panels of a matrix to be subjected to the LU-factorization, the row panels being processed by the processor; (B) generating a second panel by integrating column panels among the panels of the matrix, the column panels being processed by the processor; and (C) computing a matrix product of the first panel and the second panel.

In such a manner, it is possible to increase computational efficiency for matrix products, and thus to reduce processing time to solve a set of simultaneous linear equations.

In the processing of computing matrix products, communication processing may be executed, in parallel with the computation of the matrix products, to receive and transmit a column panel to be used for computation of a subsequent matrix product from or to another processor among the processors (c1). In such a manner, it is possible to conceal communication time, and thus to further reduce processing time to solve a set of simultaneous linear equations.

In the processing of computing matrix products, the computation of the matrix products and the communication processing may be performed in batches (c2). In such a manner, it is possible to execute the communication processing to be executed without omission.

In addition, the parallel computing method may further include processing of computing matrix products using the head block of the column panel with the smallest column number among the column panels and the row panel with the smallest row number among the row panels if the lengths in the column direction of the column panels are different (D). This makes it possible to deal with a case where lengths in the column direction are different.

Moreover, the parallel computing method may further include processing of making an exchange of rows for the column panel with the smallest column number among the column panels (E). This makes it possible to solve the problem of the processing order which arises when panels are integrated.

A program may be created to cause the processors to execute the processing in accordance with the above-described method. The program is stored in a computer readable storage medium or storage device such as a flexible disk, a CD-ROM, a magneto-optical disk, a semiconductor memory, or a hard disk drive. Here, the results of intermediate processing are temporarily stored in a main memory or other storage devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium that stores a program causing a first processor among a plurality of processors configured to perform LU factorization in parallel, to execute processing comprising:
    generating a first panel by integrating a plurality of row panels among panels of a local array of a matrix to be subjected to the LU-factorization, the plurality of row panels being processed by the first processor;
    generating a second panel by integrating a plurality of column panels among the panels of the local array, the plurality of column panels being processed by the first processor; and
    computing a matrix product of the first panel and the second panel;
    wherein the matrix is composed of a plurality of blocks which are distributed to the plurality of processors, and the blocks distributed to each of the plurality of processors form the local array.

2. The storage medium according to claim 1, wherein in the computing the matrix product,
    communication processing is executed, in parallel with the computation of the matrix product, to receive or transmit a column panel to be used for computation of a subsequent matrix product from or to another processor among the plurality of processors.

3. The storage medium according to claim 2, wherein in the computing the matrix product,
    the computation of the matrix product and the communication processing are performed in batches.

4. The storage medium according to claim 1, wherein the program further causes the first processor to execute processing of computing the matrix product using a head block of a column panel with the smallest column number among the plurality of column panels and a row panel with the smallest row number among the plurality of row panels if lengths in a column direction of the plurality of column panels are different.

5. The storage medium according to claim 1, wherein the program further causes an exchange of rows to be executed for a column panel with the smallest column number among the plurality of column panels.

6. A parallel computer system comprising a plurality of processors configured to perform LU factorization in parallel, the parallel computer system being configured to cause each of the plurality of processors to execute processing comprising:
    generating a first panel by integrating a plurality of row panels among panels of a local array of a matrix to be subjected to the LU-factorization, the plurality of row panels being processed by the processor,
    generating a second panel by integrating a plurality of column panels among the panels of the local array, the plurality of column panels being processed by the processor, and
    computing a matrix product of the first panel and the second panel;
    wherein the matrix is composed of a plurality of blocks which are distributed to the plurality of processors, and the blocks distributed to each of the plurality of processors form the local array.

7. A parallel computing method of causing each of a plurality of processors configured to perform LU factorization in parallel, to execute processing comprising:
    generating a first panel by integrating a plurality of row panels among panels of a local array of a matrix to be subjected to the LU-factorization, the plurality of row panels being processed by the processor,
    generating a second panel by integrating a plurality of column panels among the panels of the local array, the plurality of column panels being processed by the processor, and
    computing a matrix product of the first panel and the second panel;
    wherein the matrix is composed of a plurality of blocks which are distributed to the plurality of processors, and the blocks distributed to each of the plurality of processors form the local array.

* * * * *